United States Patent
Yasumura

(10) Patent No.: US 6,831,846 B2
(45) Date of Patent: Dec. 14, 2004

(54) SWITCHING POWER SOURCE CIRCUIT WITH DRIVE FREQUENCY VARIABLY CONTROLLED BY SWITCHING ELEMENT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/469,400

(22) PCT Filed: Mar. 5, 2002

(86) PCT No.: PCT/JP02/02018

§ 371 (c)(1),
(2), (4) Date: May 14, 2004

(87) PCT Pub. No.: WO02/071589

PCT Pub. Date: Sep. 12, 2002

(65) Prior Publication Data

US 2004/0196671 A1 Oct. 7, 2004

(30) Foreign Application Priority Data

| Mar. 5, 2001 | (JP) | 2001-059847 |
| May 24, 2001 | (JP) | 2001-155408 |
| Jun. 29, 2001 | (JP) | 2001-198725 |
| Jun. 29, 2001 | (JP) | 2001-198726 |
| Jun. 29, 2001 | (JP) | 2001-198727 |

(51) Int. Cl.[7] .......................................... H02M 3/335
(52) U.S. Cl. ............................................... 363/21.02
(58) Field of Search ........................... 363/18, 19, 20, 363/21.01, 21.02, 21.03, 95, 97, 131

(56) References Cited

U.S. PATENT DOCUMENTS

| 4,258,309 | A | * | 3/1981 | Ohsaka et al. ............. 323/287 |
| 5,978,234 | A | * | 11/1999 | Nagahira ..................... 363/19 |
| 6,310,786 | B1 | * | 10/2001 | Yasumura ................. 363/21.03 |
| 6,370,041 | B2 | * | 4/2002 | Yasumura ..................... 363/19 |
| 6,370,043 | B1 | * | 4/2002 | Yasumura ................. 363/21.02 |
| 6,388,902 | B1 | * | 5/2002 | Yasumura ................. 363/21.02 |
| 6,396,717 | B2 | * | 5/2002 | Yasumura ................. 363/21.02 |
| 6,577,510 | B1 | * | 6/2003 | Yasumura ................. 363/21.02 |
| 6,590,787 | B2 | * | 7/2003 | Yasumura ................. 363/21.03 |
| 6,747,883 | B2 | * | 6/2004 | Yasumura ..................... 363/98 |
| 2002/0012259 | A1 | * | 1/2002 | Yasumura ..................... 363/97 |

FOREIGN PATENT DOCUMENTS

| EP | 0883231 A1 | * | 9/1998 |
| JP | 1-194867 | * | 8/1989 |
| JP | 11-55949 | * | 2/1999 |
| JP | 2001-136745 | * | 5/2001 |

* cited by examiner

Primary Examiner—Adolf Berhane
(74) Attorney, Agent, or Firm—Jay H. Maioli

(57) ABSTRACT

A complex resonance type switching converter provided with a self-excited voltage resonance type converter has a conduction controlling device Q2 connected in series with a control winding Nc of a drive transformer CDT in which a detecting winding NA, a driving winding NB of a self-oscillation driving circuit, and the control winding Nc are wound on an identical core. An amount of current conducted in the conduction controlling device Q2 is varied, whereby a level of a base current flowing from the self-oscillation driving circuit to a base of a switching device Q1 is changed and switching frequency of the switching device Q1 is variably controlled. Thereby a conduction angle and the switching frequency of the switching device are changed simultaneously, and consequently constant-voltage control is effected on a direct-current output on the secondary side of the converter. Use of such a drive transformer CDT makes it possible to prevent variations of the self-oscillation driving circuit and reduce size.

8 Claims, 16 Drawing Sheets

SWITCHING POWER SOURCE CIRCUIT WITH DRIVE FREQUENCY VARIABLY CONTROLLED BY SWITCHING ELEMENT

TECHNICAL FIELD

The present invention relates to a switching power supply circuit provided as a power supply for various electronic apparatus.

BACKGROUND ART

Various switching power supply circuits formed with various resonance type converters, for example, have been proposed. Resonance type converters readily obtain high power conversion efficiency and achieve low noise by forming a sinusoidal waveform in switching operation. The resonance type converters have another advantage of being able to be formed by a relatively small number of parts.

FIG. 14 is a circuit diagram showing an example of a prior art switching power supply circuit. As a fundamental configuration of the power supply circuit shown in FIG. 14, a voltage resonance type converter is provided as a switching converter on the primary side.

In the power supply circuit shown in FIG. 14, a bridge rectifier circuit Di and a smoothing capacitor Ci generate a rectified and smoothed voltage Ei from a commercial alternating-current power.

The voltage resonance type converter for receiving and interrupting the rectified and smoothed voltage Ei employs a single-ended system using one transistor. A self-excited configuration is employed as a driving system. In this case, a bipolar transistor such as a high withstand voltage BJT (Bipolar Junction Transistor) is selected as a switching device Q1 for forming the voltage resonance type converter. A primary-side parallel resonant capacitor Cr is connected in parallel with a collector and an emitter of the switching device Q1. A clamp diode DD is connected between a base and the emitter of the switching device Q1. The parallel resonant capacitor Cr forms a primary-side parallel resonant circuit in conjunction with leakage inductance L1 obtained at a primary winding N1 of an isolation converter transformer PIT, whereby operation of the voltage resonance type converter is obtained.

The base of the switching device Q1 is connected with a self-oscillation driving circuit comprising a driving winding NB, a resonant capacitor CB, and a base current limiting resistance RB. The switching device Q1 is supplied with a base current based on an oscillating signal generated in the self-oscillation driving circuit, and is thereby driven for switching operation. Incidentally, at the time of a start, the switching device Q1 is started by a starting current flowing from a line of the rectified and smoothed voltage Ei to the base of the switching device Q1 via a starting resistance Rs.

FIG. 15A and FIG. 15B show a structure of an orthogonal type control transformer PRT. FIG. 15A is an external perspective view of assistance in explaining a general structure of the orthogonal type control transformer PRT. FIG. 15B is a sectional perspective view of assistance in explaining winding directions of windings wound in the orthogonal type control transformer PRT.

The orthogonal type control transformer PRT is formed by winding a control winding Nc in a winding direction orthogonal to a winding direction of the driving winding NB and a resonance current detecting winding ND.

The orthogonal type control transformer PRT has a gap length G of 10 μm at junctions of magnetic legs 21a to 21d and magnetic legs 22a to 22d, respectively.

The control winding Nc of the orthogonal type control transformer PRT is formed by a 60 μm φ polyurethane-covered copper wire wound by 1000 T (turns), for example; the detecting winding ND is formed by a 0.3 mm φ polyurethane-covered copper wire wound by 1 T; and the driving winding NB is formed by a 0.3 mm φ polyurethane-covered copper wire wound by 3 T.

The isolation converter transformer PIT transmits a switching output of the switching converter obtained on the primary side to the secondary side.

As shown in FIG. 16, for example, the isolation converter transformer PIT has an E—E-shaped core formed of E-shaped ferrite cores CR1 and CR2. As shown in FIG. 16, the primary winding N1 and a secondary winding N2 each formed by a litz wire are wound in respective divided regions using a dividing bobbin B.

A gap G is formed in a central magnetic leg of the E—E-shaped core, as shown in FIG. 16. Gap length of the gap G determines leakage inductance in the isolation converter transformer PIT. Also, loose coupling at a required coupling coefficient is obtained by the gap length of the gap G. The coupling coefficient in this case is 0.85, for example, to obtain a state of loose coupling, and accordingly saturation is not readily reached. The gap G can be formed by making the central magnetic leg of the E-shaped cores CR1 and CR2 shorter than two outer magnetic legs of the E-shaped cores CR1 and CR2. The gap length in this case is about 1 mm.

As shown in FIG. 14, the primary winding N1 of the isolation converter transformer PIT has one end connected to the line of the direct-current input voltage (rectified and smoothed voltage Ei) via the current detecting winding ND, and another end connected to the collector of the switching device Q1. The switching device Q1 performs switching operation on the direct-current input voltage. With the above-described form of connection, the switching output of the switching device Q1 is supplied to the primary winding N1 and the current detecting winding ND, and thus an alternating voltage having a cycle corresponding to switching frequency occurs.

An alternating voltage induced by the primary winding N1 of the isolation converter transformer PIT occurs in the secondary winding N2. In this case, a secondary-side parallel resonant capacitor C2 is connected in parallel with the secondary winding N2. Thereby, leakage inductance L2 of the secondary winding N2 and capacitance of the secondary-side parallel resonant capacitor C2 form a parallel resonant circuit. The parallel resonant circuit converts the alternating voltage induced in the secondary winding N2 to a resonance waveform. That is, a voltage resonance operation is obtained on the secondary side.

On the secondary side of the isolation converter transformer PIT in this case, an anode of a rectifier diode D01 is connected to the secondary winding N2 and a cathode of the rectifier diode D01 is connected to a smoothing capacitor C01, whereby a half-wave rectifier circuit is formed. The half-wave rectifier circuit provides a secondary-side direct-current output voltage E01 across the smoothing capacitor C01.

Further, in this case, the secondary winding N2 is provided with a tap. As shown in FIG. 14, a half-wave rectifier circuit comprising a rectifier diode D02 and a smoothing capacitor C02 is formed for the tap output. The half-wave rectifier circuit provides a secondary-side direct-current output voltage E02 lower than the secondary-side direct-current output voltage E01.

The secondary-side direct-current output voltages E01 and E02 are each supplied to a required load circuit. The secondary-side direct-current output voltage E01 is also outputted from a branch point as a detection voltage for a control circuit 1.

The control circuit 1 functions as an error amplifier receiving the direct-current output voltage E01 as a detection input. Specifically, a voltage obtained by dividing the direct-current output voltage E01 by resistances R3 and R4 is inputted as a control voltage to a control terminal of a shunt regulator Q3. Hence the shunt regulator Q3 allows a current having a level corresponding to the direct-current output voltage E01 to flow as a control current Ic to the control winding Nc. That is, the level of the control current flowing through the control winding Nc is variably controlled.

Since the level of the control current flowing through the control winding Nc is changed, the orthogonal type control transformer PRT effects control so as to change inductance LB of the driving winding NB. Thereby resonance frequency of a resonant circuit comprising the driving winding NB and the resonant capacitor CB in the self-oscillation driving circuit is changed, and therefore the switching frequency of the switching device Q1 is variably controlled. Since the switching frequency of the switching device Q1 is thus changed, the secondary-side direct-current output voltage is controlled and stabilized to be constant. Incidentally, the inductance LB of the driving winding NB changes from 8 $\mu$H to 2.5 $\mu$H for the control current Ic=10 mA to 60 mA.

The orthogonal type control transformer PRT has a very small gap G of about 10 $\mu$m as described above in order to reduce the amount of control current to be passed through the control winding. Thus, at the time of manufacturing, errors in accuracy of gap thickness of the gap G occur, causing variations in the inductance value of the driving winding NB wound in the orthogonal type control transformer PRT.

Variations in permeability of the ferrite cores, displacement between the magnetic legs at the time of joining, and the like also result in variations in the inductance value of the driving winding NB.

As a result of these, the value of the inductance LB varies about ±10%.

In addition, winging the winding NC in a direction orthogonal to that of the detecting winding ND and the driving winding NB in the orthogonal type control transformer PRT greatly complicates a winding process in manufacturing. Further, joining the magnetic legs of the cores 21 and 22 together without displacement makes an assembly process difficult. Thus, the orthogonal type control transformer PRT is manufactured with a high degree of difficulty, and its cost is difficult to reduce.

DISCLOSURE OF INVENTION

In view of the above problems, a switching power supply circuit according to the present invention is comprised as follows.

The switching power supply circuit includes: switching means including a first switching device for performing switching operation on a direct-current input voltage; an isolation converter transformer connected in series with the first switching device, for transmitting a switching output obtained in the primary winding by the switching operation to a secondary winding; and a first resonant circuit formed by the primary winding of the isolation converter transformer and a first capacitor, for producing voltage resonance of the switching output.

The switching power supply circuit further includes a drive transformer having a detecting winding connected in series with the primary winding or the secondary winding of the isolation converter transformer, a driving winding excited by a switching output obtained in the detecting winding, and a control winding for controlling inductance of the driving winding by a change in current level, at least the driving winding and the control winding being wound on an identical core.

The switching power supply circuit further includes switching driving means having a second resonant circuit formed by the driving winding and a second capacitor, for switching driving of the first switching device on the basis of an output of the second resonant circuit.

The switching power supply circuit further includes direct-current output voltage generating means for rectifying the switching output transmitted to the secondary winding and thereby providing a direct-current output voltage.

The switching power supply circuit further includes constant-voltage control means having a series connection circuit formed by connecting a second switching device in series with the control winding, for variably controlling switching frequency of the first switching device by variably controlling the current level in the series connection circuit according to a level of the direct-current output voltage, and thereby effecting constant-voltage control on the direct-current output voltage.

The power supply circuit thus comprised has the drive transformer. The power supply circuit thus employs a fundamental configuration of a complex resonance type converter driving the switching device by self-excitation. For constant-voltage control, the power supply circuit has the series connection circuit including the second switching device. A current flowing through the switching driving means for performing switching driving by self-excitation branches to the series connection circuit via the control winding of the drive transformer. By varying the current level in the series connection circuit, the amount of current flowing through the switching driving means is changed, whereby the switching frequency of the switching device is variably controlled.

With such a constant-voltage control configuration, variations in the inductance value when the orthogonal type control transformer that has been in use for variably controlling the switching frequency is used in the case of self-excitation, for example, can be prevented.

Further, in place of such a drive transformer, a driving winding is provided to an isolation converter transformer, a second resonant circuit formed by the driving winding, an inductor, and a capacitor is formed, and switching driving means for switching driving of the first switching device on the basis of an output of the second resonant circuit is provided. A second switching device is connected in parallel with the switching driving means. A current level in the second switching device is variably controlled according to a level of a direct-current output voltage. It is thereby possible to variably control switching frequency of the first switching device, and thus effect constant-voltage control on the direct-current output voltage.

BEST MODE FOR CARRYING OUT THE INVENTION

Figure 1:
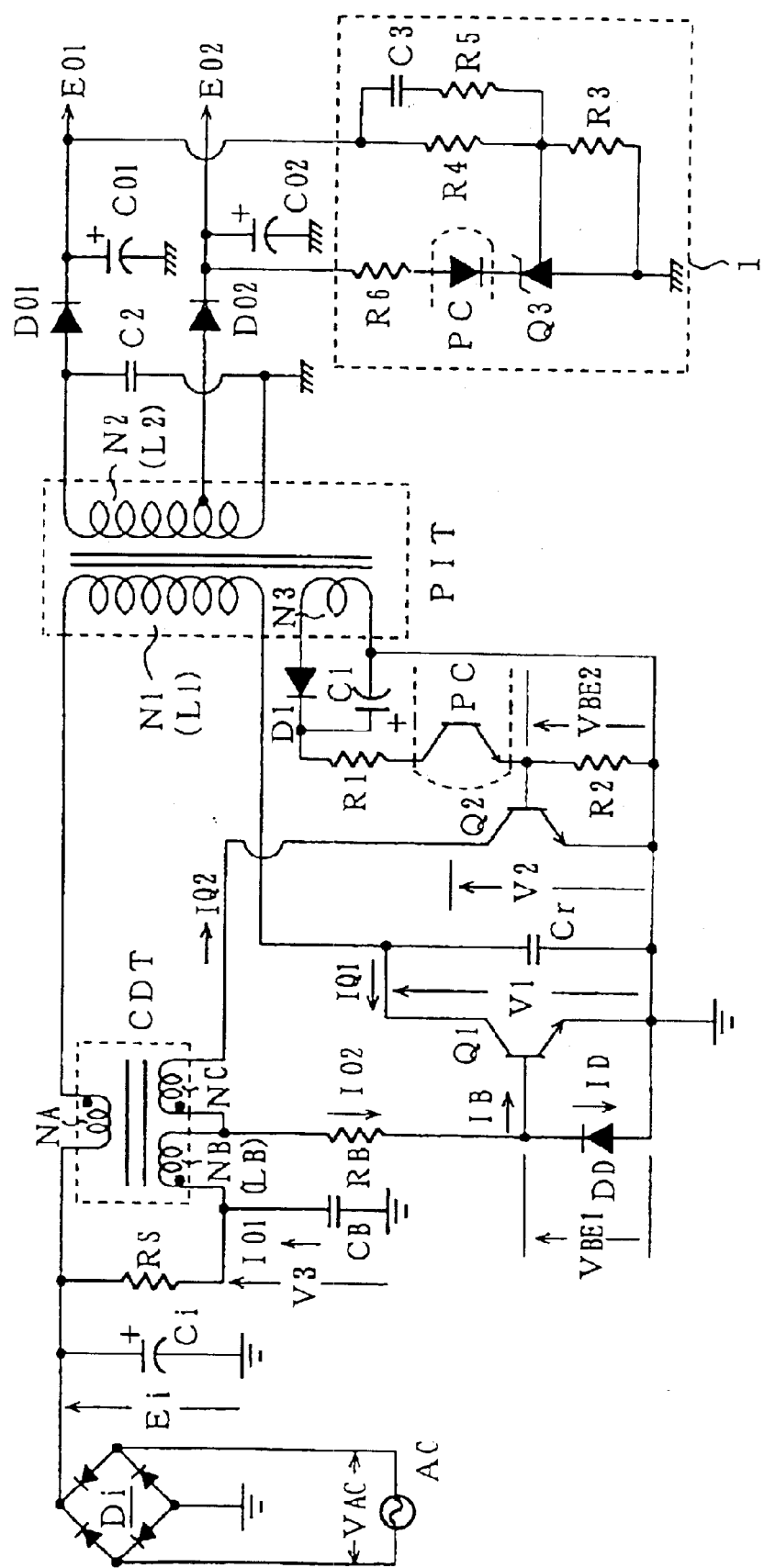
FIG. 1 is a circuit diagram of an example of configuration of a switching power supply circuit according to a first embodiment of the present invention.
Figure 2:
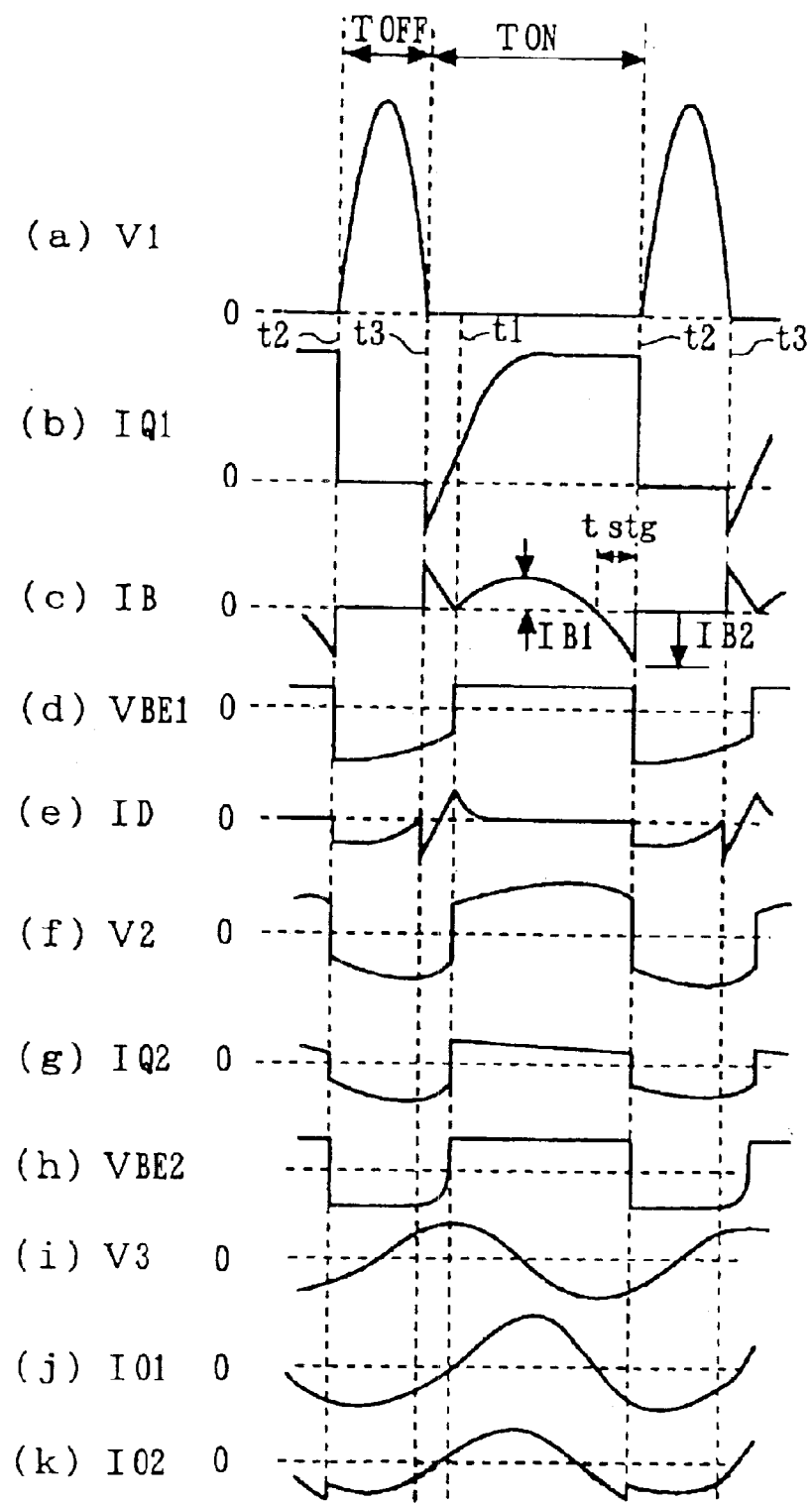
FIGS. 2(*a*) to 2(*k*) are waveform charts showing operation of the power supply circuit according to the first embodiment at a heavy load.
Figure 3:
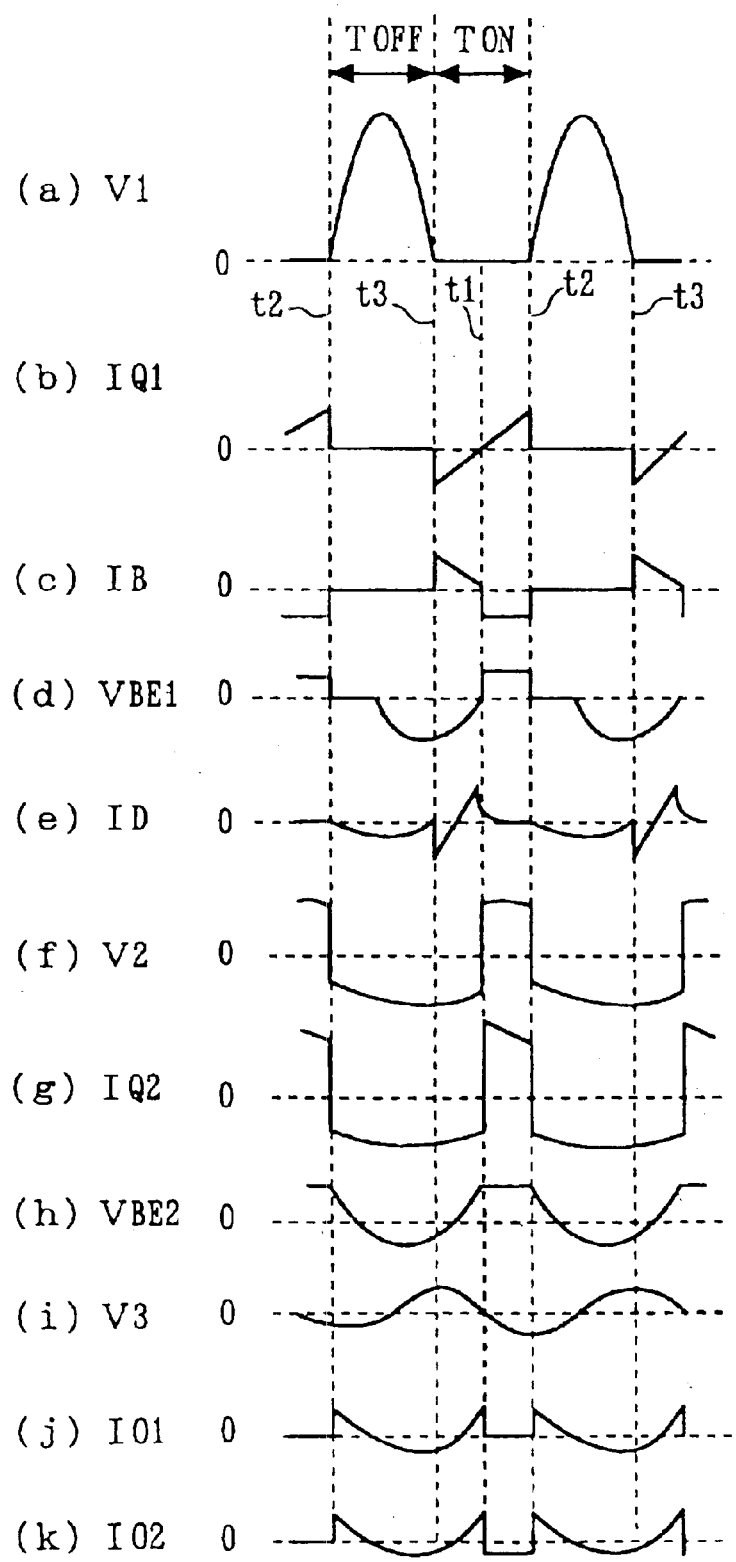
FIGS. 3(a) to 3(k) are waveform charts showing operation of the power supply circuit according to the first embodiment at no load.

FIG. 1 shows a configuration of a power supply circuit according to a first embodiment of the present invention.

Figure 14:
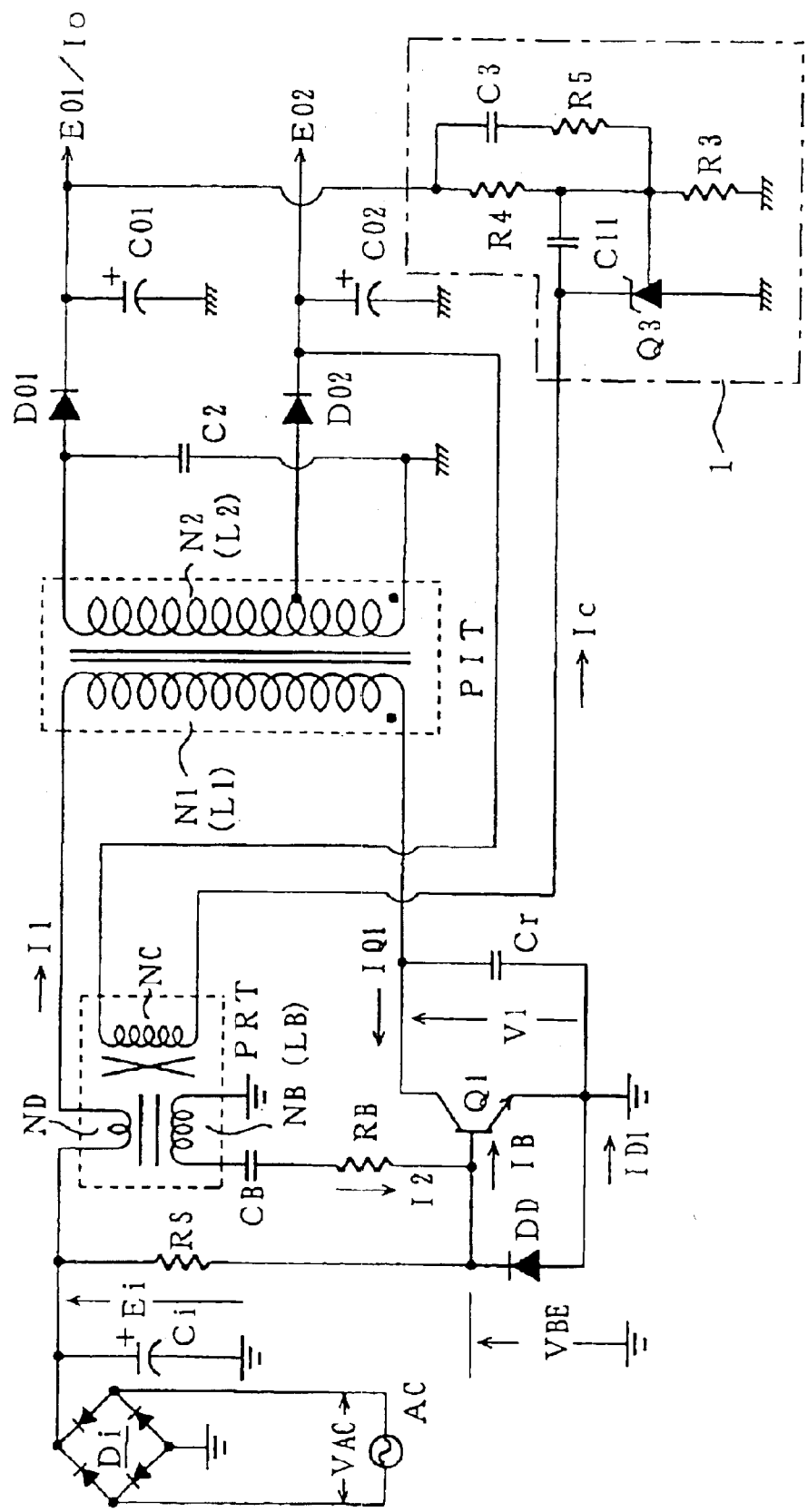
FIG. 14 is a circuit diagram of an example of configuration of a prior art switching power supply circuit.

The power supply circuit shown in FIG. 1 employs a configuration of a complex resonance type switching converter provided with a voltage resonance type converter on a primary side thereof and a parallel resonant circuit on a secondary side thereof. Incidentally, in FIG. 1, the same parts as in FIG. 14 are identified by the same reference numerals, and description thereof will be omitted.

A drive transformer CDT is provided to drive a switching device Q1 by self-excitation.

In this case, a detecting winding NA is on a primary side of the drive transformer CDT. The detecting winding NA is connected in series with a primary winding N1 of an isolation converter transformer PIT. The detecting winding NA detects an switching output of the switching device Q1 which output is transmitted to the primary winding N1 of the isolation converter transformer PIT. A driving winding NB is wound on a secondary side where an alternating voltage obtained in the detecting winding NA is induced. The driving winding NB forms a self-oscillation driving circuit for driving the switching device Q1 for switching operation.

Further, in the first embodiment, a control winding Nc is wound on the primary side of the drive transformer CDT.

The windings mentioned above are wound in winding directions such that the driving winding NB and the control winding Nc are in phase and the detecting winding NA is in opposite phase to that of the windings NB and Nc, as shown in the figure.

Figure 5:
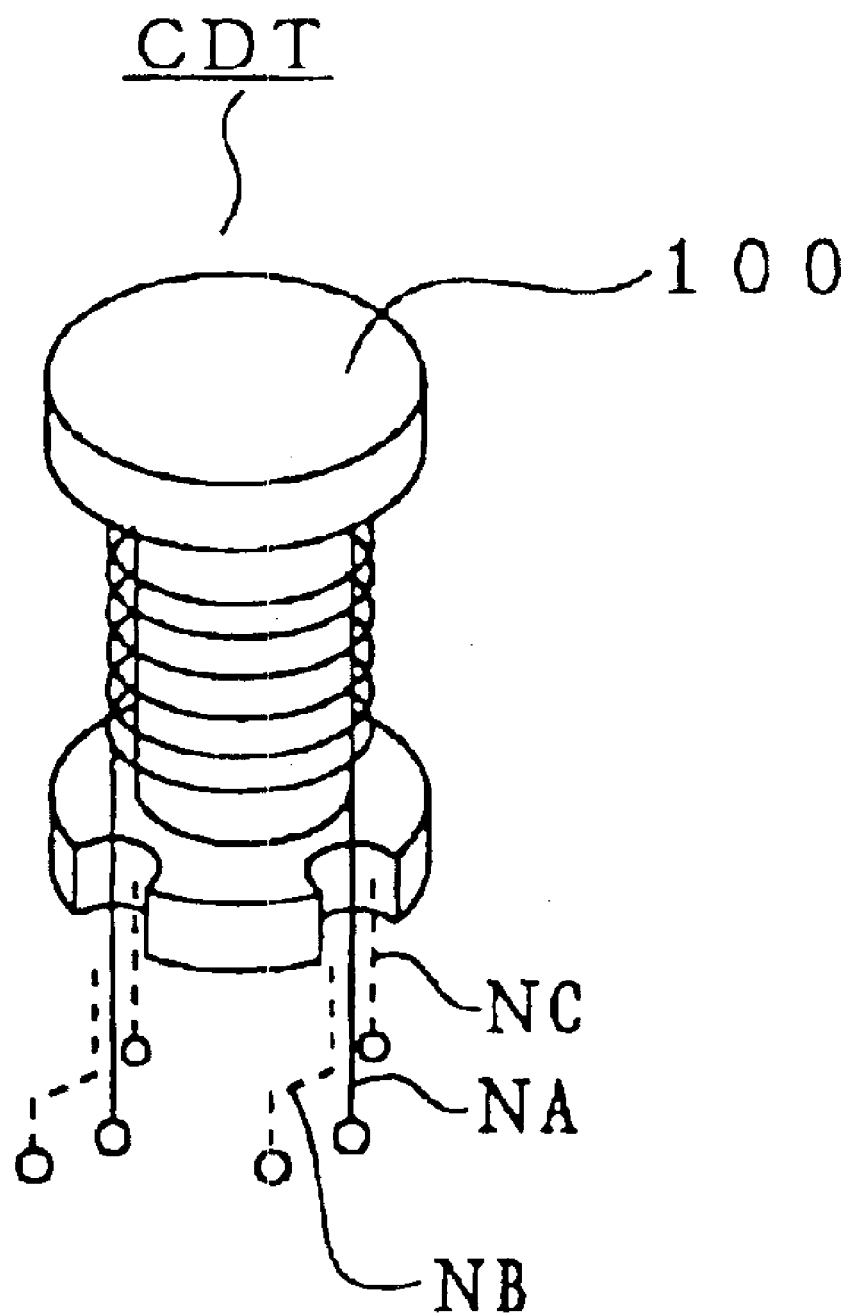
FIG. 5 is a perspective view of an example of structure of a drive transformer.
Figure 6:
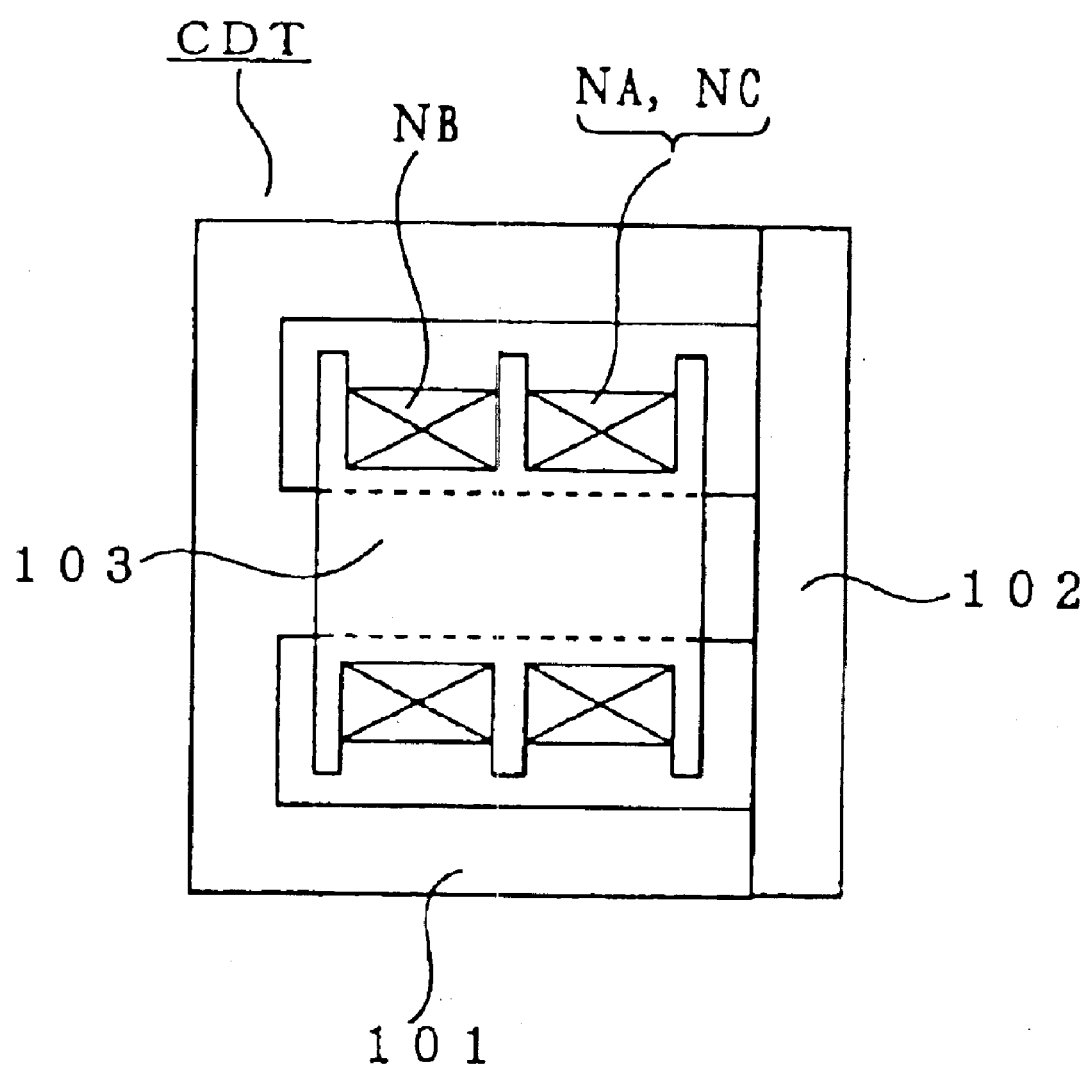
FIG. 6 is a sectional view of another example of structure of a drive transformer.

The drive transformer CDT in which the above windings (NA, NB, and Nc) are wound can employ a ferrite core as shown in FIG. 5 or an EI-shaped ferrite core as shown in FIG. 6, for example. The drive transformer CDT in the case of FIG. 5 is formed by winding the detecting winding NA, the driving winding NB, and the control winding Nc on a ferrite core 100.

In the case of FIG. 6, an I-shaped core 102 and an E-shaped core 101 are combined with each other as shown in the figure to form an EI-shaped core. The drive transformer CDT is formed by disposing a dividing bobbin 103 around a central magnetic leg of the E-shaped core 101, and winding each of the detecting winding NA, the driving winding NB, and the control winding Nc around the dividing bobbin 103 as shown in FIG. 6, for example.

Figure 15A:
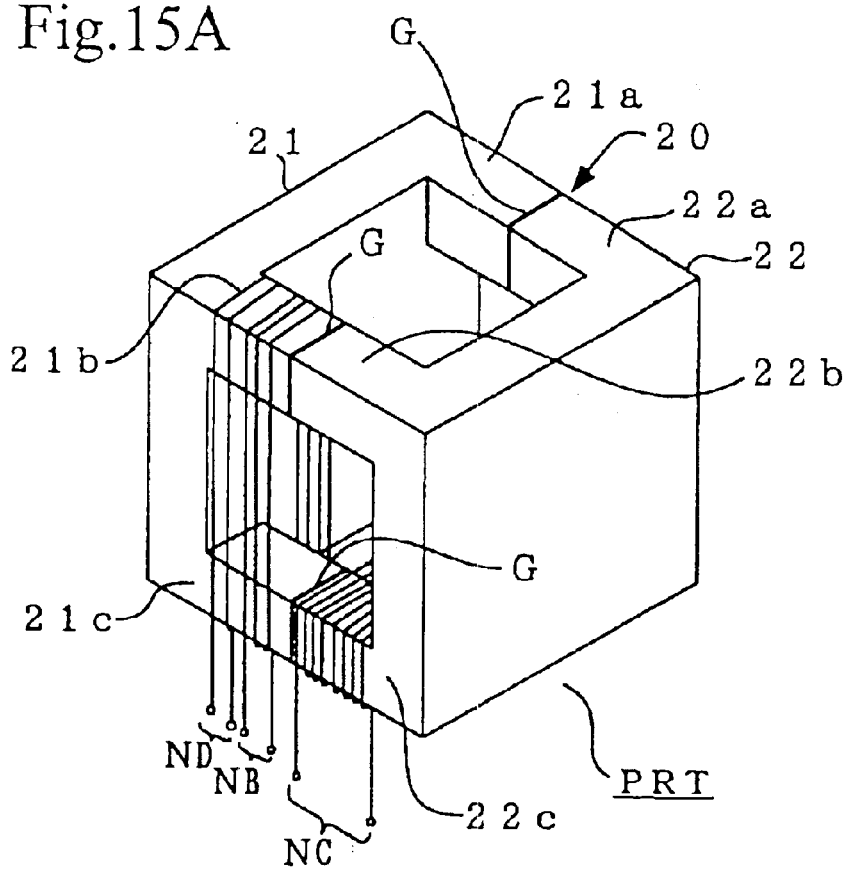
FIG. 15A is a perspective view of an example of structure of an orthogonal type control transformer in the switching power supply circuit shown in FIG. 14.
Figure 15B:
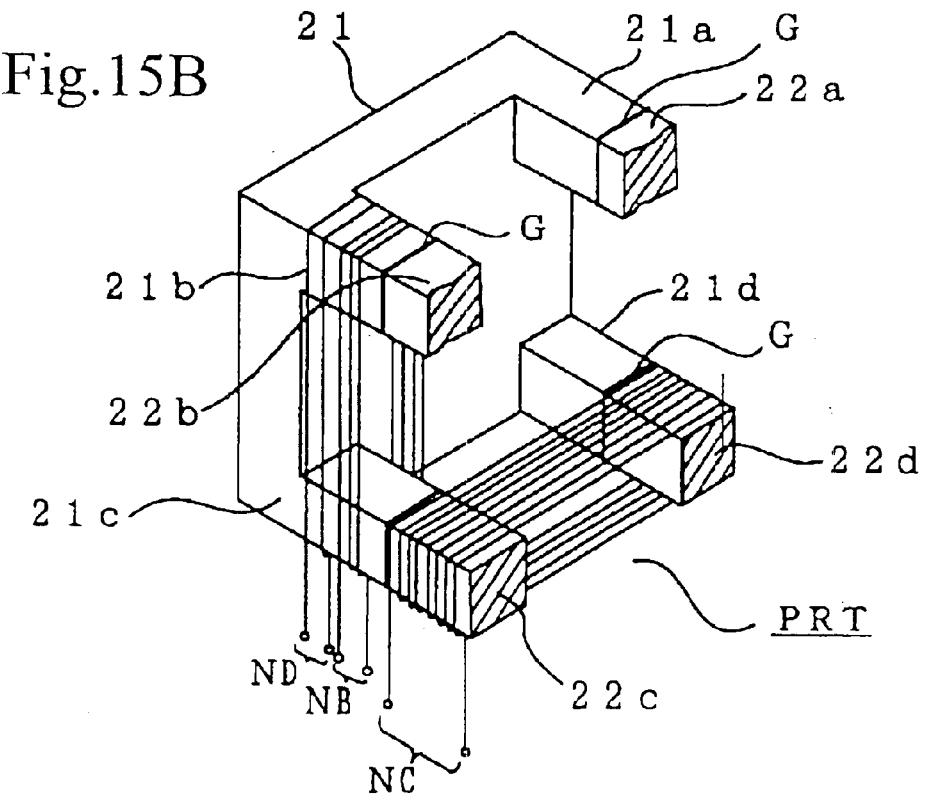
FIG. 15B is a sectional view of the example of structure of the orthogonal type control transformer in the switching power supply circuit shown in FIG. 14.

The drive transformer CDT of the structure shown in FIG. 5 or FIG. 6 is simpler in structure itself than the orthogonal type control transformer PRT of FIGS. 15A and 15B, for example. The drive transformer CDT can therefore be considerably reduced in size and weight.

The driving winding NB of the self-oscillation driving circuit is excited by the detecting winding NA, thereby generating an alternating voltage as a drive voltage. This drive voltage causes a series resonant circuit including NB and CB to perform self-oscillating operation and thereby provide a resonance output. Thereby the switching device Q1 performs switching operation at a switching frequency determined by resonance frequency of the series resonant circuit. The switching output obtained in a collector of the switching device Q1 excites the primary winding N1 of the isolation converter transformer PIT.

A starting resistance Rs in this case is inserted between a line of a rectified and smoothed voltage Ei and a node of the driving winding NB and the resonant capacitor CB. At the time of a power start, for example, a base current flows from the rectified and smoothed voltage Ei through the starting resistance Rs and further the driving winding NB and a base current limiting resistance RB to a base of the switching device Q1, thereby starting the switching operation.

The control winding Nc wound in the drive transformer CDT of the first embodiment has a starting point side connected to an ending point of the driving winding NB. Also, the control winding Nc has an ending point connected to a collector of a conduction controlling device Q2 formed by an NPN-type bipolar transistor. The conduction controlling device Q2 has an emitter connected to a ground on the primary side.

With such connections, it can be considered that the driving winding NB and the conduction controlling device Q2 are connected in series with each other via the control winding Nc.

Figure 16:
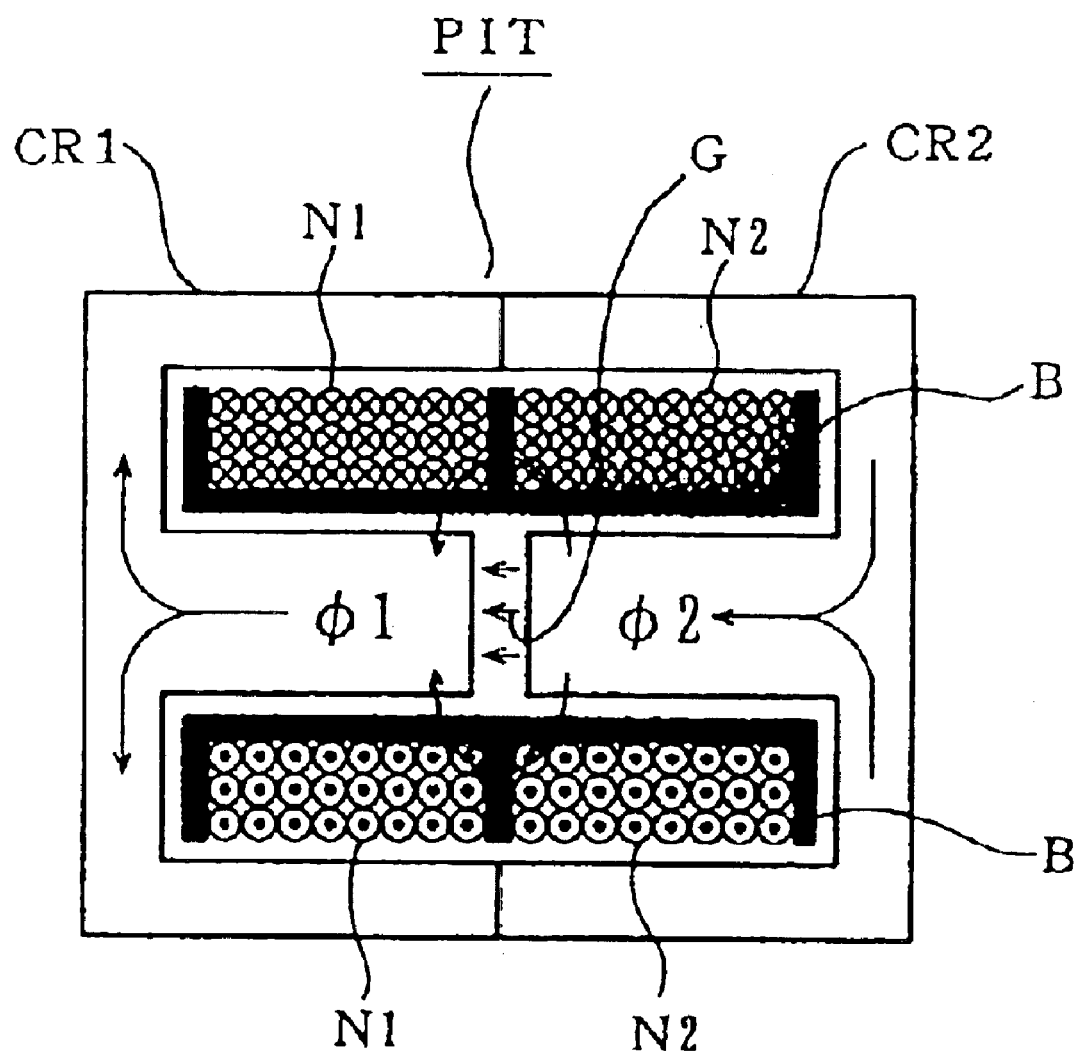
FIG. 16 is a diagram showing an example of structure of an isolation converter transformer in the switching power supply circuit shown in FIG. 14.

As in the conventional example, the isolation converter transformer PIT uses the structure shown in FIG. 16.

The isolation converter transformer PIT has a tertiary winding N3 wound on the primary side thereof. The tertiary winding N3 is connected with a half-wave rectifier circuit comprising a diode D1 and a capacitor C1 as shown in FIG. 1, to provide a low direct-current voltage. The low direct-current voltage is provided through a resistance R1 to a base of the conduction controlling device Q2 via a phototransistor of a photocoupler PC. A resistance R2 is inserted between the base and emitter of the conduction controlling device Q2. A base-to-emitter voltage VBE2 is obtained across the resistance R2.

Since the circuit on the base side of the conduction controlling device Q2 is thus formed, the conduction controlling device Q2 variably controls an amount of conduction of a collector current IQ2 according to an amount of conduction of a current varied in the phototransistor of the photocoupler PC.

The amount of conduction of the current in the phototransistor of the photocoupler PC is controlled by operation of a control circuit 1 provided on the secondary side. This will be described later.

An alternating voltage induced by the primary winding N1 occurs in a secondary winding N2 of the isolation converter transformer PIT. A secondary-side direct-current output voltage E01 is obtained from the alternating voltage induced in the secondary winding N2 by a half-wave rectifier circuit comprising a secondary-side rectifier diode D01 connected to the secondary winding N2 and a smoothing capacitor C01.

Further, the secondary winding N2 is provided with a tap output. A half-wave rectifier circuit comprising a secondary-side rectifier diode D02 and a smoothing capacitor C02 is connected between the tap output and a ground on the secondary side as shown in FIG. 1, whereby a secondary-side direct-current output voltage E02 lower than the secondary-side direct-current output voltage E01 is obtained.

In this case, the secondary-side direct-current output voltage E01 is inputted to the control circuit 1 as a detection voltage for constant-voltage control.

The control circuit 1 functions as an error amplifier receiving the direct-current output voltage E01 as a detection input. Specifically, a voltage obtained by dividing the direct-current output voltage E01 by resistances R3 and R4 is inputted as a control voltage to a control terminal of a shunt regulator Q3. Hence the shunt regulator Q3 allows a current having a level corresponding to the direct-current output voltage E01 to flow to a photodiode of the photocoupler PC.

A change in an amount of conduction of the current in the photodiode varies the amount of conduction of the current in the phototransistor of the photocoupler PC which phototransistor is connected to the base of the conduction controlling device Q2 on the primary side. The level of the collector current IQ2 of the conduction controlling device Q2 is therefore variably controlled, as described above. Thereby an amount of current flowing through the control winding Nc connected to the collector of the conduction controlling device Q2 is changed. This operation changes the switching frequency of the switching device Q1, whereby the secondary-side direct-current output voltage is stabilized to be constant.

Thus, the power supply circuit according to the first embodiment of the present invention uses the drive transformer CDT, the photocoupler PC, and the conduction controlling device Q2 in place of the orthogonal type control transformer PRT. The power supply circuit variably controls the level of the collector current IQ2 of the conduction controlling device Q2 disposed on the primary side of the isolation converter transformer PIT on the basis of the current having the level corresponding to the direct-current output voltage E01 on the secondary side of the isolation converter transformer PIT, so that the switching frequency of the switching device Q1 is changed. Thereby the secondary-side direct-current output voltage is stabilized and isolation between the primary side and the secondary side is secured.

FIGS. 2(a) to 2(k) and FIGS. 3(a) to 3(k) show operating waveforms of main parts in the power supply circuit having the configuration shown in FIG. 1. The former show operation at a heavy load where load power Po is 162 W. The latter show operation at no load where load power Po is 0 W.

In obtaining the operations shown in these figures, parts are selected as follows.

Inductance LB of driving winding NB=10 $\mu$H

Control winding Nc=20T

Detecting winding NA=4T

Resonant capacitor CB=0.56 $\mu$F.

Base current limiting resistance RB=0.47 $\Omega$

It is to be noted that the above values for the windings NB, Nc, and NA are selected in the case where the ferrite core 100 shown in FIG. 5 is used as the drive transformer CDT. When the EI-shaped core shown in FIG. 6 is used, selections can be made such that the detecting winding NA=1T, the driving winding NB=5T, and the control winding Nc=10T.

Resonance operation of the series resonant circuit of the driving winding NB and the resonant capacitor CB generates a resonance voltage V3 in a form of a sine wave corresponding to a switching cycle at the resonant capacitor CB, as shown in FIG. 2(i) and FIG. 3(i). Thus, a resonance current I01 having a waveform as shown in FIG. 2(j) and FIG. 3(j) flows through the resonant capacitor CB.

In the first embodiment, the resonance current I01 flowing through the resonant capacitor CB as mentioned above is divided into a path for flowing as a driving current I02 to the base side of the switching device Q1 via the base current limiting resistance RB and a path for flowing as the collector current IQ2 to the conduction controlling device Q2 via the control winding Nc.

As shown in FIG. 2(k) and FIG. 3(k), the driving current I02 flows in substantially the same waveform as that of the resonance current I01 (FIG. 2(j) and FIG. 3(j)). The driving current I02 then branches into a base current IB flowing to the base of the switching device Q1 and a damper current ID flowing to a clamp diode DD.

First, in a period of t3 to t1 in a period TON during which the switching device is turned on, due to effect of a reverse recovery time trr of the clamp diode DD, the slow recovery type clamp diode DD conducts, and the damper current ID flows as shown in FIG. 2(e) and FIG. 3(e). The damper current ID in this period of t3 to t1 flows through a PN junction of the base and collector of the switching device Q1.

Accordingly, as shown in FIG. 2(b) and FIG. 3(b), a waveform flowing in a direction of negative polarity is obtained as a collector current IQ1 of the switching device Q1 in the period of t3 to t1. As shown in FIG. 2(c) and FIG. 3(c), the base current IB rises in positive polarity at the time t3 and falls to zero level until the time t1.

In a subsequent period of t1 to t2, the clamp diode DD is off. In this period, as the base current IB (FIG. 2(c) and FIG. 3(c)), a forward current IB1 of positive polarity first flows, and thereafter in a base stored carrier disappearing time tstg, the current is reversed to negative polarity and a current IB2 flows in the reverse direction. The switching device Q1 conducts in response to the base current IB. Thus, as shown in FIG. 2(b) and FIG. 3(b), the collector current IQ1 of positive polarity flows through the collector of the switching device Q1.

On completion of the base stored carrier disappearing time tstg in which the current IB2 in the reverse direction flows, the base current IB (FIG. 2(c) and FIG. 3(c)) comes to zero level, whereby the switching device Q1 proceeds to a period TOFF during which the switching device Q1 is turned off.

As shown in FIG. 2(d) and FIG. 3(d), in the period TOFF (period of t2 to t3) and the period of t3 to t1 within the period TON, a base-to-emitter voltage VBE1 of the switching device Q1 is of negative polarity, whereby the switching device Q1 is reverse-biased. In the period of t1 to t2 in the period TON, the base-to-emitter voltage VBE1 maintains a level given a predetermined offset with respect to zero level.

The switching device Q1 performs switching operation as described above, whereby as shown in FIG. 2(a) and FIG. 3(a), a resonance voltage V1 obtained across a primary-side parallel resonant capacitor Cr is at zero level during the period TON during which the switching device Q1 is on, and has a sinusoidal pulse waveform during the period TOFF during which the switching device Q1 is off. This indicates voltage resonance type operation of the primary-side switching converter.

Operation of the conduction controlling device Q2, or the NPN-type bipolar transistor is as follows.

Since the collector of the conduction controlling device Q2 is connected in series with the driving winding NB via the control winding Nc, the resonance current I01 of the self-oscillation driving circuit including NB and CB is divided into the driving current I02 to flow through the base current limiting resistance RB and the collector current IQ2 of the conduction controlling device Q2. That is, the resonance current I01 can be expressed as I01=I02+IQ2.

As shown in FIG. 2(h) and FIG. 3(h), over the period TOFF (period of t2 to t3) and the succeeding period of t3 to t1 within the period TON, the base-to-emitter voltage VBE2 of the conduction controlling device Q2 is of negative polarity, whereby the conduction controlling device Q2 is reverse-biased. Accordingly, the resonance current I01 within the self-oscillation driving circuit has a waveform of reversed negative polarity in the period of t2 to t3 to t1.

Thus the conduction controlling device Q2 operates as a so-called reverse transistor, and in the period from t2 to t3 to t1, current flows from the emitter to the collector in the conduction controlling device Q2. Thereby, as shown in FIG. 2(g) and FIG. 3(g), the collector current IQ2 of the conduction controlling device Q2 has a waveform of negative polarity in the period from t2 to t3 to t1.

In the remaining period of t1 to t2 within the period TON, the base-to-emitter voltage VBE2 of the conduction controlling device Q2 maintains a fixed level of positive polarity to be a bias of positive polarity. Accordingly, a reverse current flows from the collector to the emitter in the conduction controlling device Q2 in the period of t1 to t2, and hence the collector current IQ2 has a waveform of reversed positive polarity, as shown in FIG. 2(g) and FIG. 3(g).

Since the collector current IQ2 flows as described above, as shown in FIG. 2(f) and FIG. 3(f), a collector-to-emitter voltage V2 of the conduction controlling device Q2 has a waveform of negative polarity in the period from t2 to t3 to t1 and a waveform of positive polarity in the period from t1 to t2.

Now suppose that the level of the secondary-side direct-current output voltage E01 is raised as a result of an increase in an alternating input voltage VAC or a decrease in load, for example. The control circuit 1 effects control so as to increase the amount of conduction of the current in the photodiode of the photocoupler PC. Thereby the amount of conduction in the phototransistor of the photocoupler PC on the primary side is controlled to be increased. Thus, the base current of the conduction controlling device Q2 is increased, and amplitude of the base-to-emitter voltage VBE2 is also increased.

The conduction controlling device Q2 is controlled as described above, whereby the collector current IQ2 of the conduction controlling device Q2 is controlled to be increased in amplitude.

As described above, the collector current IQ2 of the conduction controlling device Q2 flows after being branched off from the resonance current I01, which can be expressed as I01=I02+IQ2. Thus, when the collector current IQ2 of the conduction controlling device Q2 is increased in amplitude and hence the collector current IQ2 is increased in amount in the period of t1 to t2, the driving current I02 is changed so as to be correspondingly decreased in amount. The waveform of the base current IB obtained on the basis of the driving current I02 is changed as shown as a transition from FIG. 2(c) to FIG. 3(c), for example. Thus the base stored carrier disappearing time (tstg) of the switching device Q1 is shortened. Thus, length of the period of t1 to t2 within the period TON during which the switching device Q1 is on is changed to be shortened.

The shortened period of t1 to t2 within the period TON reduces length of the period TON as a whole even though the period of t3 to t1 preceding the period of t1 to t2 is not varied. Therefore the switching frequency of the switching device Q1 is controlled to be increased. This is shown by comparison between FIGS. 2(a) to 2(k) and FIGS. 3(a) to 3(k), in which time length of one switching cycle comprising the period TON+TOFF is shortened under lighter load conditions.

The variable control of the switching frequency changes resonance impedance of the primary-side parallel resonant circuit, for example, and thereby changes power transmitted from the primary side to the secondary side of the isolation converter transformer PIT. Thereby the level of the secondary-side direct-current output voltage is also variably controlled eventually, whereby the power supply is stabilized.

Specifically, the voltage can be stabilized by variably controlling the switching frequency fs in a range of 80 KHz to 135 KHz for a variation range of the load power Po of 162 W to 0 W.

In variably controlling the switching frequency in the first embodiment, the period TOFF during which the switching device Q1 is turned off is fixed, and the period TON during which the switching device Q1 is turned on is varied.

With the configuration of the constant voltage control circuit system of the first embodiment described above, the orthogonal type control transformer PRT shown in FIG. 15 can be replaced with the drive transformer CDT, the photocoupler PC, and the conduction controlling device Q2.

The first embodiment thereby solves the problem of variation in an inductance value of the driving winding NB resulting from variation in the gap or the like at the time of producing the orthogonal type control transformer PRT.

Figure 4:
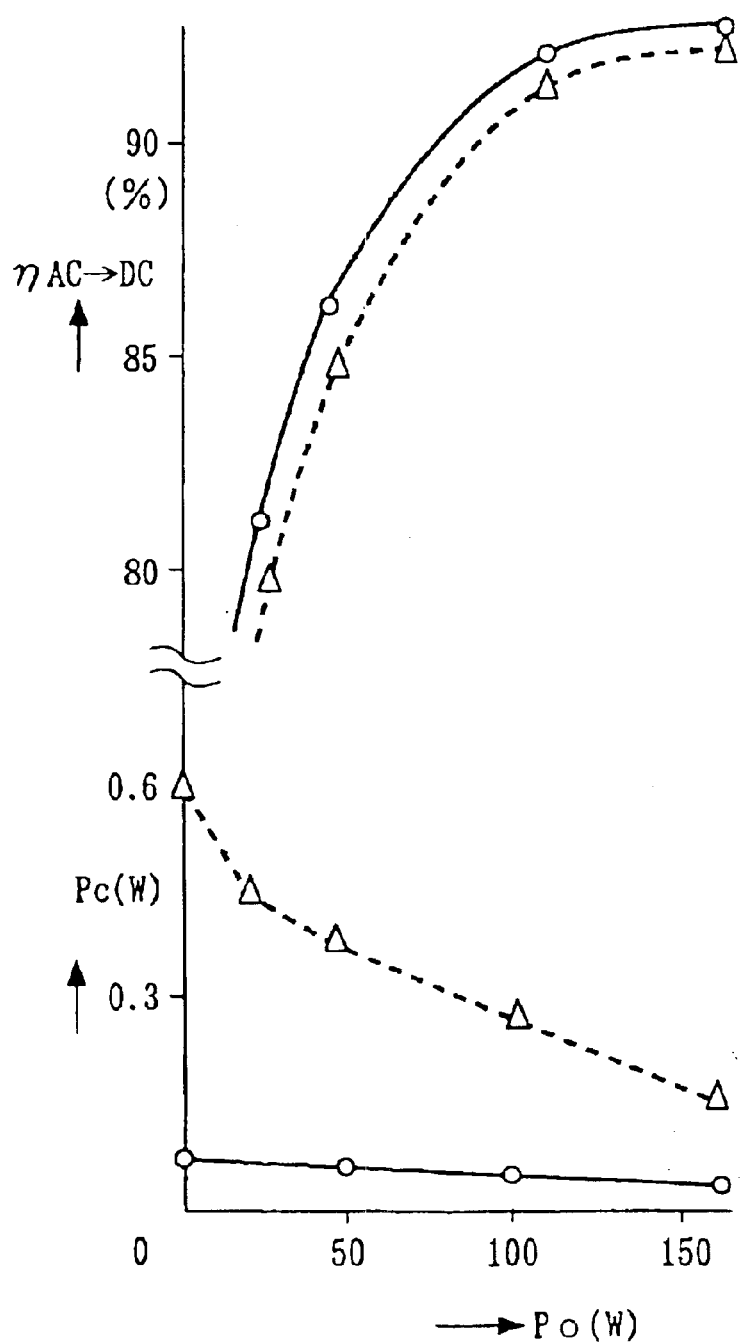
FIG. 4 is a characteristic diagram showing characteristics of AC-DC power conversion efficiency and control power for voltage stabilization in the power supply circuit shown in FIG. 1 with respect to load variation in comparison with the prior art.

FIG. 4 shows power conversion efficiency characteristics and control power required to control the switching frequency by solid lines as characteristics of the power supply circuit according to the first embodiment shown in FIG. 1 in comparison with characteristics shown by broken lines of the prior art power supply circuit shown in FIG. 14.

As is understood from FIG. 4, the control power Pc for a load variation range of the load power Po=0 W to 162 W is about 0.60 W to 0.15 W in the power supply circuit shown in FIG. 14. On the other hand, the control power Pc is 0.07 W to 0.05 W in the power supply circuit shown in FIG. 1, thus reducing power loss.

This is because the amount of current flowing through the conduction controlling device Q2 in the circuit shown in FIG. 1 is considerably smaller than the amount of control current flowing through the control winding Nc in the circuit shown in FIG. 14.

Thus, a low-withstand-voltage and small-capacity product with a withstand voltage of 30 V and a rated current of 0.15 A or less can be selected as the bipolar transistor serving as the conduction controlling device Q2.

FIG. 4 also shows that power conversion efficiency η AC-DC of the power supply circuit shown in FIG. 1 is higher than that of the power supply circuit shown in FIG. 14 over the load variation range of the load power Po of 0 W to 162 W. That is, overall power conversion efficiency of the power supply circuit shown in FIG. 1 is improved as compared with the power supply circuit shown in FIG. 14.

Figure 7:
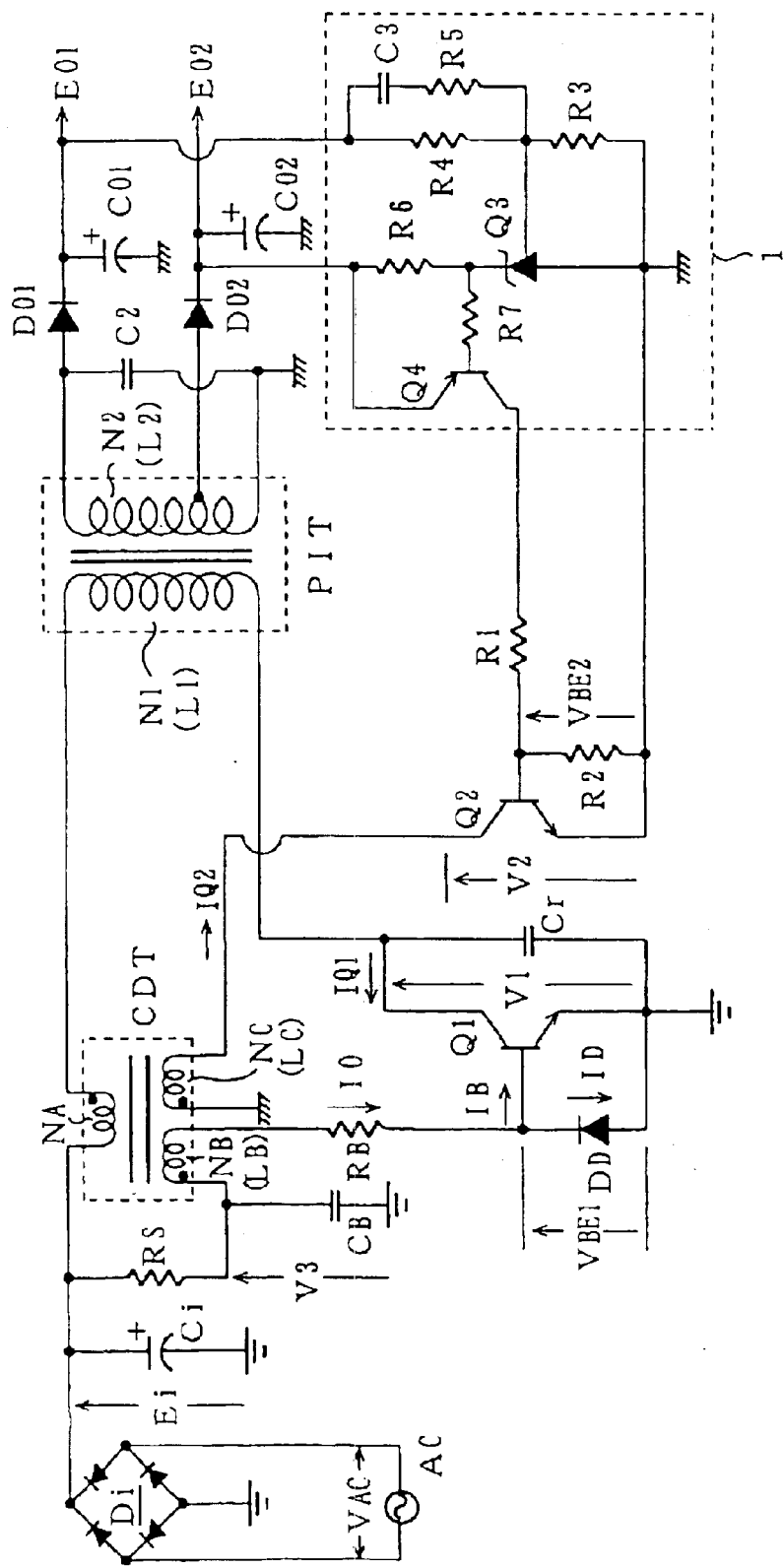
FIG. 7 is a circuit diagram of an example of configuration of a switching power supply circuit according to a second embodiment of the present invention.

FIG. 7 shows an example of configuration of a switching power supply circuit according to a second embodiment. Incidentally, in FIG. 7, the same parts as in FIG. 1 are identified by the same reference numerals, and description thereof will be omitted. The power supply circuit shown in FIG. 7 also has a drive transformer CDT of a structure as shown in FIG. 5 or FIG. 6.

In the drive transformer CDT, a detecting winding NA and a driving winding NB are placed on a primary side of an isolation converter transformer PIT. On the other hand, a control winding Nc is placed on a secondary side of the isolation converter transformer PIT. Accordingly, in securing insulation between the primary side and the secondary side, the second embodiment uses a triple-insulated wire for the control winding Nc.

The control winding Nc wound in the drive transformer CDT has a starting point side connected to a ground on the secondary side and an ending point connected to a collector of a conduction controlling device Q2. The conduction controlling device Q2 has an emitter connected to the ground on the secondary side. That is, the control winding Nc and the collector and the emitter of the conduction controlling device Q2 can be considered to form a series connection circuit, in which the control winding Nc and the collector and the emitter of the conduction controlling device Q2 are connected in series with each other on the secondary side of the isolation converter transformer PIT. In this case, an NPN-type bipolar transistor is selected as the conduction controlling device Q2.

A base of the conduction controlling device Q2 is connected to a collector of a PNP-type transistor Q4 provided within a control circuit 1 to be described later via a resistance R1. A resistance R2 is inserted between the base and the emitter of the conduction controlling device Q2. A base-to-emitter voltage VBE2 is obtained across the resistance R2.

A half-wave rectifier circuit comprising a secondary-side rectifier diode D01 connected to a secondary winding N2 of the isolation converter transformer PIT and a smoothing capacitor C01 is provided to obtain a secondary-side direct-current output voltage E01.

Also in this case, as in FIG. 1, the secondary winding N2 is provided with a tap output. A half-wave rectifier circuit comprising a secondary-side rectifier diode D02 and a smoothing capacitor C02 is connected between the tap output and the ground on the secondary side as shown in FIG. 7, whereby a low secondary-side direct-current output voltage E02 is obtained.

The secondary-side direct-current output voltage E01 is inputted to the control circuit 1 as a detection voltage for constant-voltage control. The secondary-side direct-current voltage E02 is used as operating power to the control circuit 1.

In the control circuit 1, a voltage obtained by dividing the direct-current output voltage E01 by resistances R3 and R4 is inputted as a control voltage to a control terminal of a shunt regulator Q3. Thereby a current having a level corresponding to the direct-current output voltage E01 flows through the shunt regulator Q3. The current is amplified by the transistor Q4, and then flows to the base of the conduction controlling device Q2.

Thereby the level of a collector current IQ2 flowing through the collector of the conduction controlling device Q2 is varied according to the level of the secondary-side direct-current voltage E02. This means variable control of the level of a current flowing through the control-winding Nc connected between the collector of the conduction controlling device Q2 and the ground on the secondary side.

This operation changes switching frequency of a switching device Q1, whereby the secondary-side direct-current output voltage is stabilized to be constant.

In FIG. 1, the tertiary winding wound in the isolation converter transformer PIT and the rectifier circuit connected to the tertiary winding are formed as a power supply for providing the current to be passed through the control winding Nc. The second embodiment eliminates the need for such a rectifier circuit, thus correspondingly contributing to reduction in size and weight of the circuit.

Although the series connection circuit formed of the control winding Nc and the conduction controlling device Q2 is equivalently connected to a self-oscillation driving circuit on the primary side, as described above, the series connection circuit is actually a circuit provided on the secondary side of the isolation converter transformer PIT, as is understood from the fact that the series connection circuit is provided between the control circuit 1 and the ground on the secondary side.

As described above, a triple-insulated wire, for example, is selected for the control winding Nc to secure direct-current insulation from the primary side and to be magnetically coupled with the driving winding NB on the primary side. The second embodiment thereby eliminates the need for adding an insulating component such as a photocoupler or the like.

Figure 8:
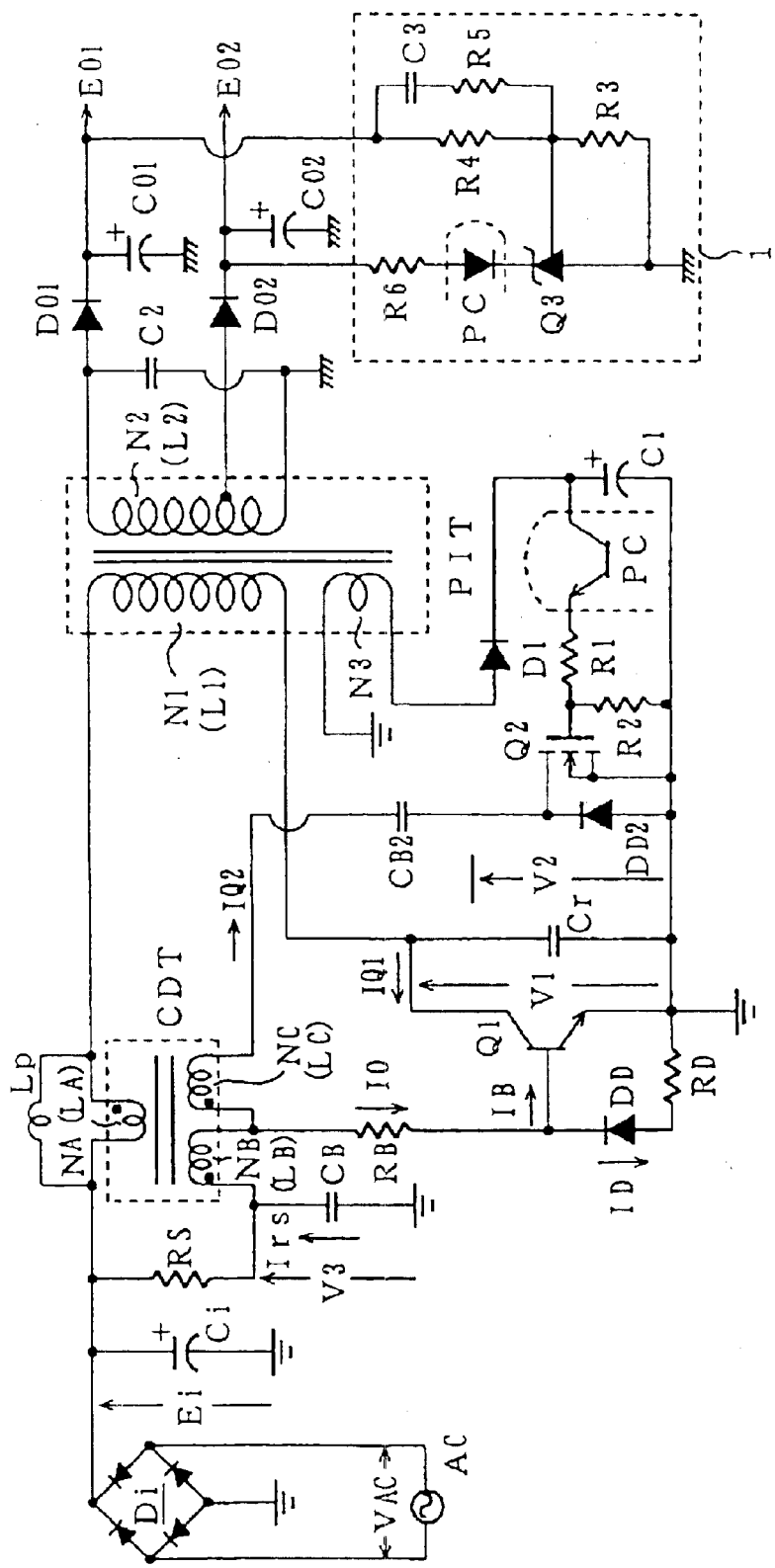
FIG. 8 is a circuit diagram of an example of configuration of a switching power supply circuit according to a third embodiment of the present invention.

FIG. 8 shows a configuration of a power supply circuit according to a third embodiment of the present invention. Incidentally, in FIG. 8, the same parts as in FIG. 1 are identified by the same reference numerals, and description thereof will be omitted.

Also in this case, a drive transformer CDT is provided to drive a switching device Q1 by self-excitation.

A control winding Nc wound in the drive transformer CDT has one end connected to a driving winding NB. The control winding Nc has another end connected to a drain of a conduction controlling device Q2 formed by a MOS-FET via a dividing capacitor CB2 connected in series with the control winding Nc. A source of the conduction controlling device Q2 is connected to a ground on the primary side. Further, a clamp diode DD2 is connected in a direction shown in FIG. 8 in parallel with the drain and the source of the conduction controlling device Q2. For the clamp diode DD2 in this case, a so-called body diode included in the MOS-FET as the conduction controlling device Q2 can be used.

With such connections, it can be considered that the driving winding NB and the conduction controlling device Q2 are connected in series with each other via the control winding Nc and the dividing capacitor CB2.

The dividing capacitor CB2 is provided so as to divide capacitance of a resonant capacitor CB. When a resistive component of the conduction controlling device Q2 is omitted, the dividing capacitor CB2 can be considered to connect a path for branching an alternating current flowing through the driving winding NB in a self-oscillation circuit (CB-NB-RB) and passing the current through the control winding Nc to a ground on the secondary side. The conduction controlling device Q2 can be considered to have a conduction control function for controlling an amount of current flowing through the control winding Nc and the dividing capacitor CB2.

As in FIG. 1, a tertiary winding N3 is wound on the primary side of an isolation converter transformer PIT. The tertiary winding N3 is provided with a half-wave rectifier circuit comprising a diode D1 and a capacitor C1 to provide a low direct-current voltage. The low direct-current voltage is connected from a phototransistor of a photocoupler PC through a resistance R1 to a gate of the conduction controlling device Q2.

An example of structure of a drive transformer CDT provided in the power supply circuit of the third embodiment will be described in the following with reference to FIG. 9.

Figure 9:
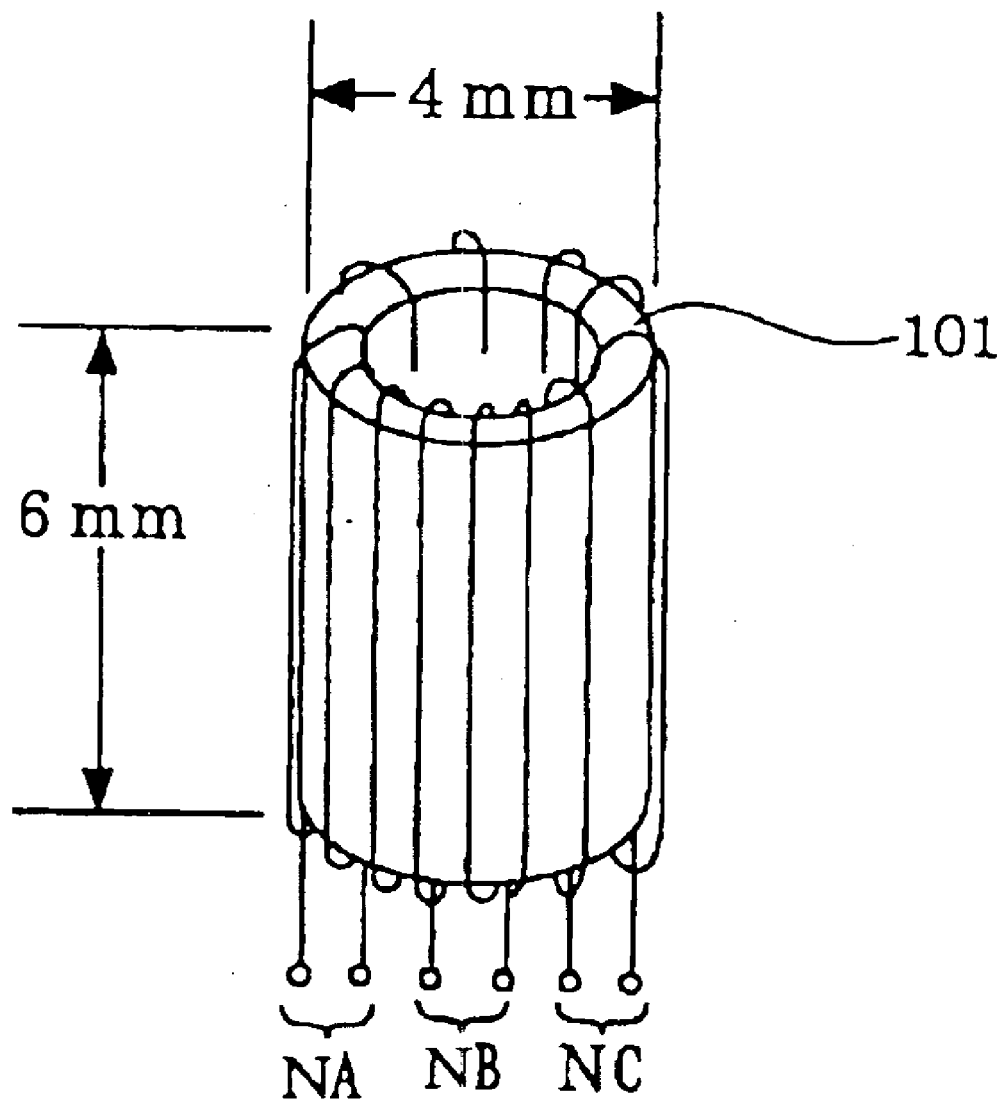
FIG. 9 is a sectional view of another example of structure of a drive transformer.

The drive transformer CDT in the third embodiment has a core 101 in a shape of a hollowed cylinder as shown in FIG. 9. A detecting winding NA, the driving winding NB, and the control winding NC are wound on the core 101.

Figure 10:
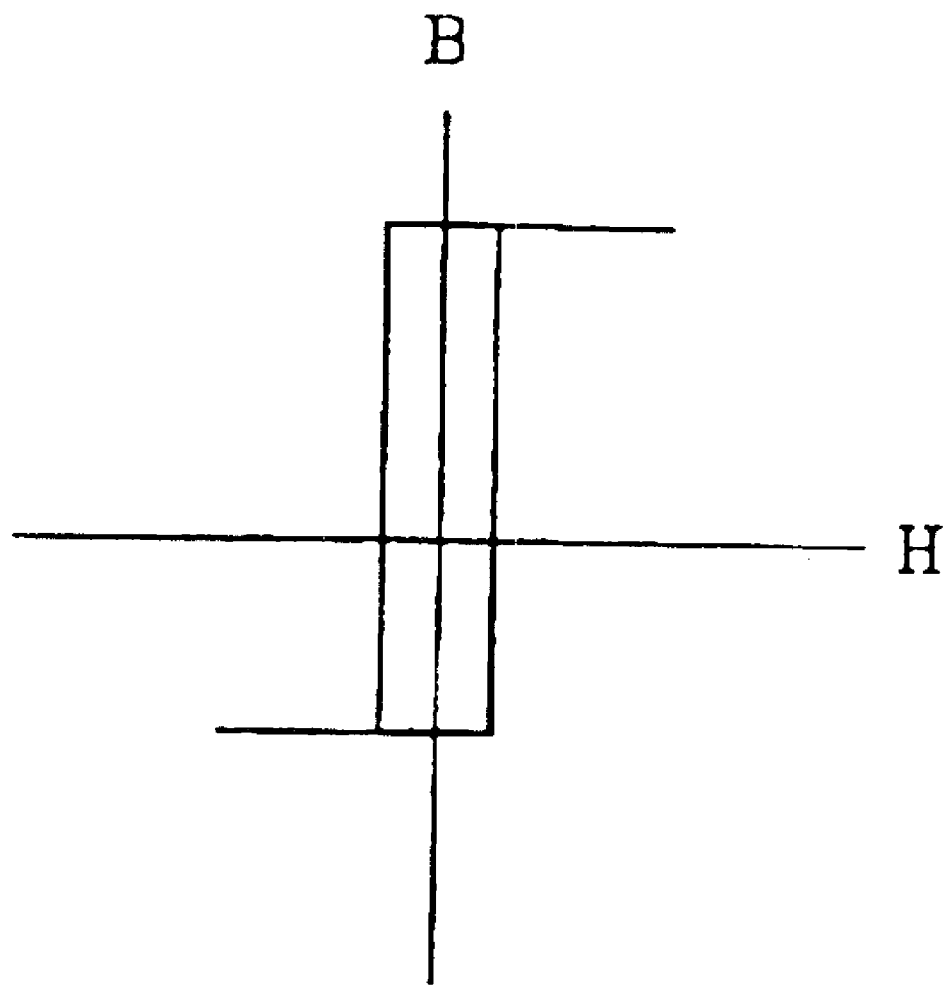
FIG. 10 is a diagram showing a magnetization curve of amorphous magnetic material used in the drive transformer shown in FIG. 9.

In the third embodiment, in particular, a cobalt-base amorphous magnetic material is used for the core 101. The amorphous magnetic material has hysteresis characteristics with a so-called high rectangularity ratio, as shown as a magnetization curve in FIG. 10. That is, the amorphous magnetic material has a property of readily reaching a state of magnetic saturation in response to even a small current change. In this case, no gap is formed in the core 101, so that a closed magnetic circuit type core is obtained. Thereby the drive transformer CDT readily reaches saturation and is formed as a variable inductance transformer.

Figure 11:
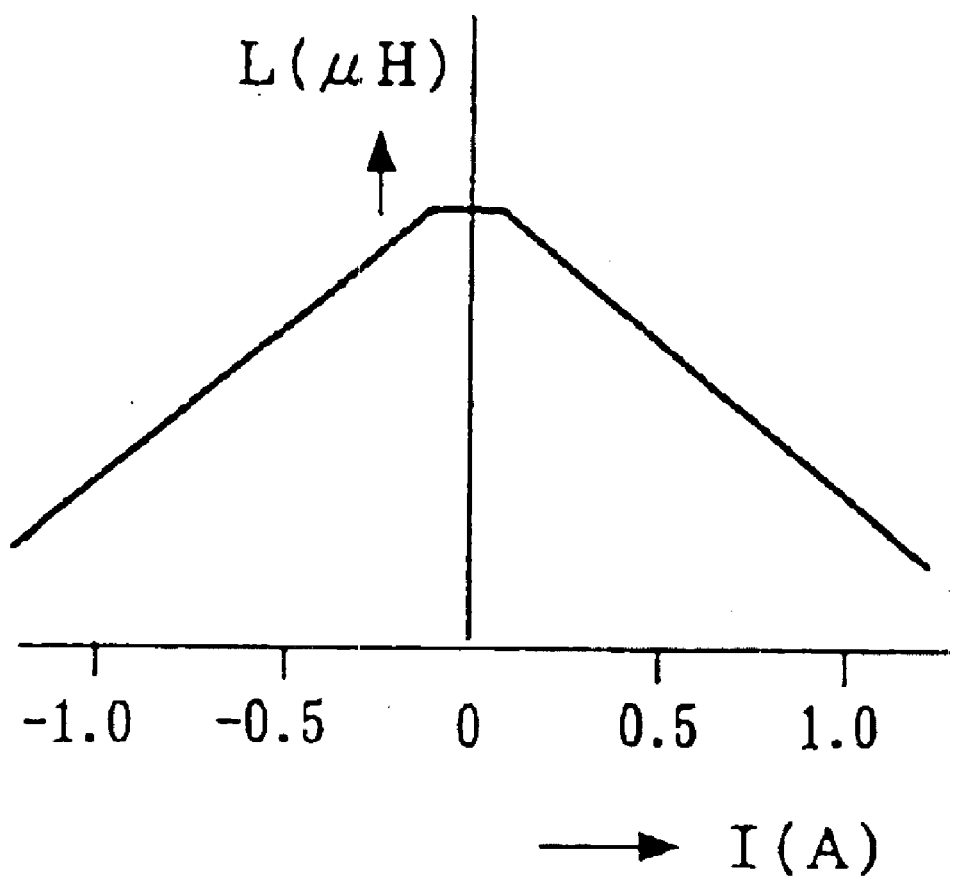
FIG. 11 is a diagram showing a relation between current and inductance of a winding wound in the drive transformer shown in FIG. 9.

With such a formation, as inductance characteristics of the detecting winding NA and the driving winding NB wound in the drive transformer CDT, the inductance of each winding is varied depending on a current I flowing through the winding, as shown in FIG. 11. Specifically, the winding has an inductance value as a component when the current I is 0 A, and as an absolute value level of the current I is increased, the inductance value decreases proportionately.

Figure 12:
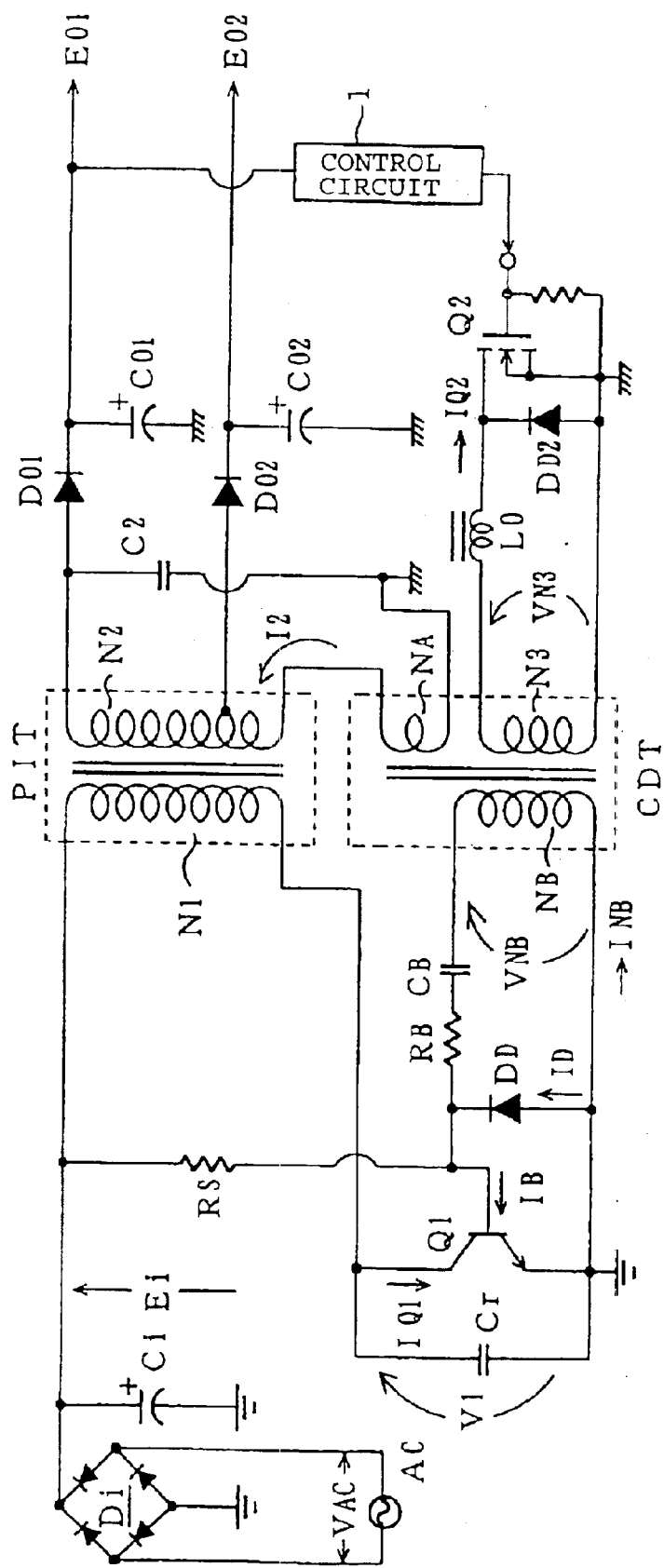
FIG. 12 is a circuit diagram of an example of configuration of a switching power supply circuit according to a fourth embodiment of the present invention.

FIG. 12 shows a configuration of a power supply circuit according to a fourth embodiment of the present invention. Incidentally, in FIG. 12, the same parts as in FIG. 1 are identified by the same reference numerals, and description thereof will be omitted.

Also in this case, a drive transformer CDT is provided to drive a switching device Q1 by self-excitation.

In this case, a detecting winding NA and a tertiary winding N3 are wound on the primary side of the drive transformer CDT. The detecting winding NA is connected in series with a secondary winding N2 of an isolation converter transformer PIT. The detecting winding NA thereby detects a switching output of the switching device Q1 induced from a primary winding N1 in the secondary winding N2 via the isolation converter transformer PIT. A driving winding NB is wound on a secondary side where an alternating voltage obtained in the detecting winding NA is induced. The driving winding NB forms a self-oscillation driving circuit for driving the switching device Q1 for switching operation.

The tertiary winding N3 is connected in parallel with a series circuit of an inductor L0 and a conduction controlling device Q2, which will be described later.

The tertiary winding N3 magnetically coupled with the driving winding NB in the drive transformer CDT can be considered to be equivalently connected in parallel with the driving winding NB.

The primary side and the secondary side of the drive transformer CDT are connected to the secondary side and the primary side, respectively, of the isolation converter transformer PIT. Thus, by using a triple-insulated wire for the driving winding NB, direct-current insulation between the primary side and the secondary side of the drive transformer CDT can be obtained.

In this case, since the detecting winding NA is connected in series with the secondary winding N2 of the isolation converter transformer PIT as described above, the driving winding NB of the drive transformer CDT is excited by the switching output voltage obtained in the secondary winding N2.

The driving winding NB is excited by the detecting winding NA, thereby generating an alternating voltage as a drive voltage. This drive voltage causes a series resonant circuit formed of the driving winding NB and a resonant capacitor CB to perform self-oscillating operation and thereby provide a resonance output. As in FIG. 14, switching operation is performed at a switching frequency determined by resonance frequency of the series resonant circuit.

A control circuit 1 outputs a voltage having a level changed according to the level of a direct-current output voltage E01 to a gate of the conduction controlling device (MOS-FET) Q2. The control circuit 1 in this case is configured such that when the level of the direct-current output voltage E01 is increased, the control circuit 1 increases the output voltage level according to the increase.

On the secondary side of the isolation converter transformer PIT, a drain of the conduction controlling device Q2 is connected to the tertiary winding N3 wound in the drive transformer CDT via the inductor L0, and a source of the conduction controlling device Q2 is connected to a ground, or one end of the tertiary winding N3, whereby the series connection circuit comprising the inductor L0 and the conduction controlling device Q2 is connected in parallel with the tertiary winding N3. Further, a diode DD2 for forming a path of a reverse current is connected in parallel with the conduction controlling device Q2. The diode DD2 may be provided separately, or a conduction controlling device Q2 including a body diode may be selected.

It can be considered that this circuit is formed by interposing the conduction controlling device Q2 in a parallel circuit comprising the tertiary winding N3 and the inductor L0.

In the fourth embodiment, a constant voltage control circuit system having the control circuit 1 and the parallel circuit comprising the conduction controlling device Q2, the tertiary winding N3, and the inductor L0 is formed. The constant voltage control circuit system operates so as to variably control the switching frequency of the switching device Q1, whereby voltage stabilization is performed.

Figure 13:
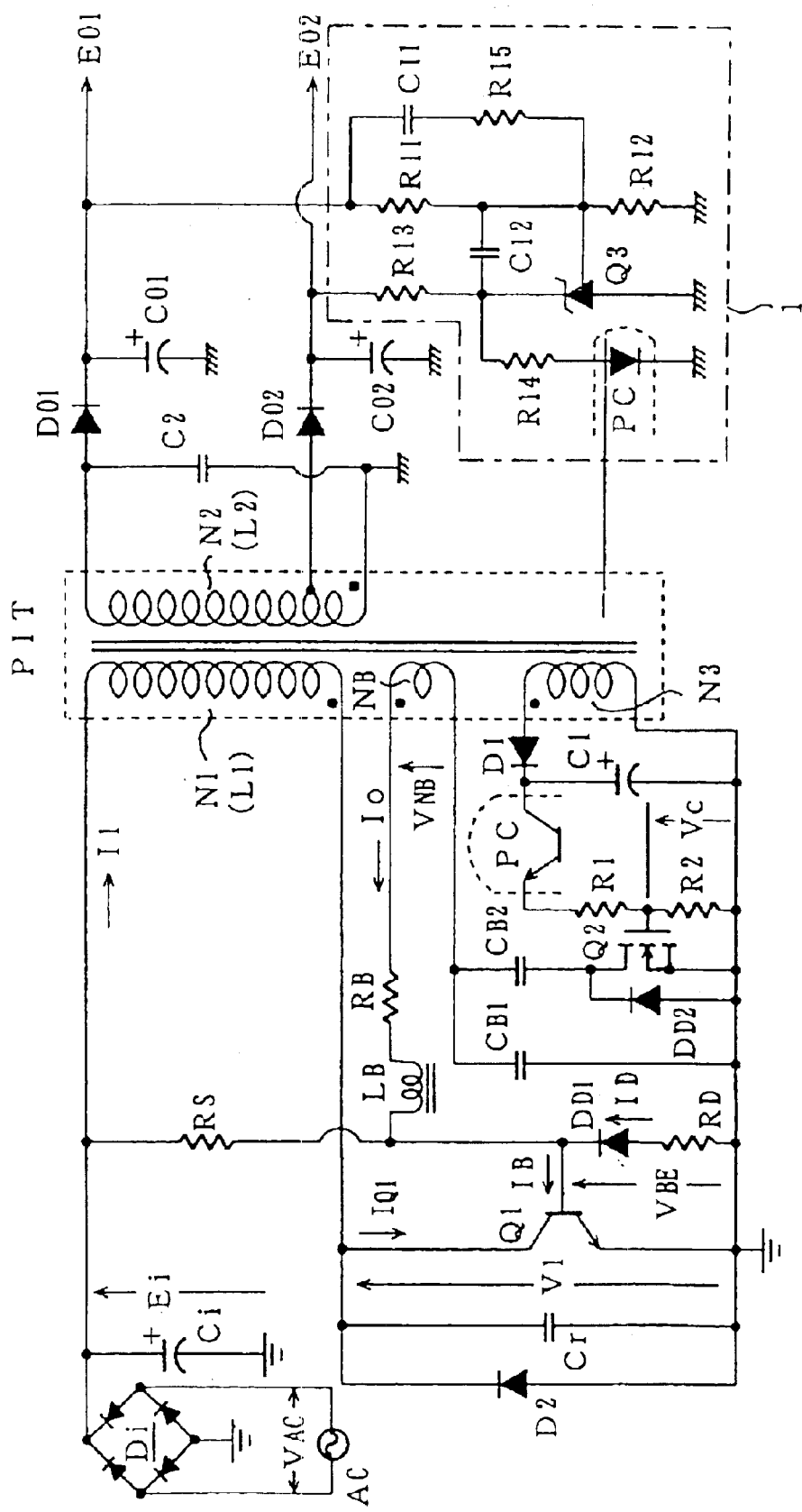
FIG. 13 is a circuit diagram of an example of configuration of a switching power supply circuit according to a fifth embodiment of the present invention.

FIG. 13 shows a configuration of a power supply circuit according to a fifth embodiment of the present invention. Incidentally, in FIG. 13, the same parts as in FIG. 1 are identified by the same reference numerals, and description thereof will be omitted.

In the circuit shown in FIG. 13, an LCR series connection circuit of a resonant capacitor CB1, a driving winding NB, a base current limiting resistance RB, and an inductor LB is connected to a base of a switching device Q1 to drive the switching device Q1 by self-excitation.

In this case, the driving winding NB within the self-oscillation driving circuit is wound on the primary side of an isolation converter transformer PIT, and is thereby excited by a switching output voltage obtained in a primary winding N1.

In this case, however, a series circuit of a capacitance varying capacitor CB2 and a MOS-FET (Q2) is connected in parallel with the resonant capacitor CB1.

The self-oscillation driving circuit generates an alternating voltage as a drive voltage in the driving winding NB, which is excited by the primary winding N1 of the isolation converter transformer PIT.

The drive voltage is outputted as a drive current to the base of the switching device Q1 via the base current limiting resistance RB and the series resonant circuit. Thereby the switching device Q1 performs switching operation at a switching frequency determined by resonance frequency of the series resonant circuit. A switching output obtained in a collector of the switching device Q1 is transmitted to the primary winding N1 of the isolation converter transformer PIT.

A control circuit 1 operates as follows. A current flows from a line of a secondary-side direct-current output voltage E02 to a photodiode of a photocoupler PC via a series connection of resistances R13 and R14. The current obtained from the line of the secondary-side direct-current output voltage E02 branches to a shunt regulator Q3 via the resistance R13.

A voltage obtained by dividing a direct-current output voltage E01 by resistances R11 and R12 is inputted as a control voltage to a control terminal of the shunt regulator Q3. The shunt regulator Q3 thereby changes a level of the current flowing from the secondary-side direct-current output voltage E02 via the resistance R13 according to the direct-current output voltage E01.

Now suppose that load power of the secondary-side direct-current output voltage E01 is supplied to a heavier load and that the level of the secondary-side direct-current output voltage E01 is thus changed to become lower. In this case, the level of the current branching from the line of the secondary-side direct-current output voltage E02 to the shunt regulator Q3 is also changed to become lower. Therefore the level of the current flowing from the line of the secondary-side direct-current output voltage E02 to the photodiode via the series connection of the resistances R13 and R14 is correspondingly increased.

This increases a level of a current conducted in a phototransistor on the primary side of the photocoupler PC. Thus a control voltage Vc obtained at a gate of the MOS-FET (Q2) by resistances R1 and R2 is applied increased by a level corresponding to the level of the current conducted in the phototransistor.

The control voltage Vc whose level is thus changed controls a state of conduction of the MOS-FET (Q2). Thereby capacitance of the capacitance varying capacitor CB2 connected in series with the MOS-FET (Q2) is controlled, that is, an effect of changing capacitance of the resonant capacitor CB1 is obtained. Thus, switching frequency applied to the base of the switching device Q1 is variably controlled.

The self-oscillation circuit formed with a series resonant circuit (CB1-NB-LB) uses a voltage VNB induced in the driving winding NB for a voltage source. In an on period TON of the switching device Q1, a resonance current Io causes a base current IB to flow to the switching device Q1. In an off period TOFF of the switching device Q1, the resonance current Io is of opposite polarity, and the base current IB is of negative polarity, whereby the switching device Q1 is turned off.

The off period of the switching device Q1 is fixed and conduction angle control for controlling the on period of the switching device Q1 is effected at the same time. Such operation provides an effect of raising the level of the secondary-side direct-current output voltage E02 when the level of the secondary-side direct-current output voltage E02 is lowered, whereby the voltage is stabilized.

While in each of the foregoing embodiments, the secondary-side parallel resonant circuit in which the secondary-side resonant capacitor C2 is connected in parallel with the secondary winding N2 is formed, a secondary-side series resonant circuit in which the secondary-side resonant capacitor C2 is connected in series with the secondary winding N2 may be formed, or the secondary-side resonant capacitor C2 may be omitted.

It is to be noted that while in each of the foregoing embodiments, a single-ended system provided with one switching device is shown, a voltage resonance type converter employing a so-called push-pull system that is provided with two switching devices may be used.

Also, it is needless to say that a circuit configuration other than that of the half-wave rectifier circuit shown in each of the embodiments may be provided for the rectifier circuit on the secondary side.

What is claimed is:

1. A switching power supply circuit characterized by comprising:

a first switching device for performing switching operation on a direct-current input voltage;

an isolation converter transformer having a primary winding and a secondary winding, said primary winding being connected in series with said first switching device, for transmitting a switching output obtained in said primary winding by the switching operation of said first switching device to said secondary winding;

a first resonant circuit formed by said primary winding of said isolation converter transformer and a first capacitor connected to said primary winding, for producing voltage resonance of said switching output;

a drive transformer having a detecting winding connected in series with the primary winding or the secondary winding of said isolation converter transformer, a driving winding excited by a switching output obtained in said detecting winding, and a control winding for controlling inductance of said driving winding by a change in current level, at least said driving winding and said control winding being wound on an identical core;

switching driving means having a second resonant circuit formed by the driving winding of said drive transformer and a second capacitor, for performing switching driving of said first switching device on the basis of an output of the second resonant circuit;

direct-current output voltage generating means for rectifying the switching output transmitted to said secondary winding and thereby providing a direct-current output voltage; and constant-voltage control means having a series connection circuit formed by connecting a second switching device in series with said control winding, for effecting constant-voltage control on said direct-current output voltage by variably controlling the current level in said series connection circuit according to a level of the direct-current output voltage obtained from said direct-current output voltage generating means.

2. A switching power supply circuit characterized by comprising:

a first switching device for performing switching operation on a direct-current input voltage;

an isolation converter transformer having a primary winding, a secondary winding, and a driving winding, said primary winding being connected in series with said first switching device, for transmitting a switching output obtained in said primary winding by the switching operation of said first switching device to said secondary winding and said driving winding;

a first resonant circuit formed by said primary winding of said isolation converter transformer and a first capacitor connected to said primary winding, for producing voltage resonance of said switching output;

switching driving means having a series resonant circuit formed by said driving winding, a second capacitor, and an inductor, for performing switching driving of said first switching device on the basis of an output of the series resonant circuit;

a series connection circuit connected in parallel with said second capacitor and including a third capacitor and a second switching device;

direct-current output voltage generating means for rectifying the switching output transmitted to said secondary winding and thereby providing a direct-current output voltage; and constant-voltage control means for effecting constant-voltage control on said direct-current output voltage by variably controlling the current level in said series connection circuit according to a level of the direct-current output voltage obtained from said direct-current output voltage generating means.

3. The switching power supply circuit as claimed in claim 1, characterized in that:

when said core has a plurality of magnetic legs, at least said driving winding and said control winding are wound on an identical magnetic leg.

4. The switching power supply circuit as claimed in claim 1, characterized in that:

ferrite magnetic material or amorphous magnetic material is used for the core of said drive transformer.

5. The switching power supply circuit as claimed in claim 1 or 2, characterized by further comprising a secondary-side resonant circuit formed by connecting a secondary-side resonant capacitor to the secondary winding of said isolation converter transformer.

6. The switching power supply circuit as claimed in claim 1 or 2, characterized in that:

said constant-voltage control means further includes a photocoupler, and controls a current flowing in said photocoupler according to the level of the direct-current output voltage obtained from said direct-current output voltage generating means and thereby variably controls a bias voltage to a control terminal of said second switching device.

7. The switching power supply circuit as claimed in claim 1, characterized in that:

a triple-insulated wire is used for said control winding or said driving winding.

8. The switching power supply circuit as claimed in claim 1 or 2, characterized in that:

a bipolar transistor or a field-effect transistor is used as said second switching device.

* * * * *